(12) United States Patent
Zuchoski et al.

(10) Patent No.: US 11,352,078 B2
(45) Date of Patent: Jun. 7, 2022

(54) TRACK SYSTEM FOR A VEHICLE

(71) Applicant: CAMSO INC., Magog (CA)

(72) Inventors: Jeremie Zuchoski, Sherbrooke (CA); Tommy Leduc, Sherbrooke (CA)

(73) Assignee: CAMSO INC., Magog (CA)

( * ) Notice: Subject to any disclaimer, the term of this patent is extended or adjusted under 35 U.S.C. 154(b) by 13 days.

(21) Appl. No.: 15/813,771

(22) Filed: Nov. 15, 2017

(65) Prior Publication Data
US 2019/0144055 A1   May 16, 2019

(51) Int. Cl.
| | |
|---|---|
| *B62D 55/084* | (2006.01) |
| *B62D 55/14* | (2006.01) |
| *B62D 55/10* | (2006.01) |
| *B62D 55/104* | (2006.01) |
| *B62D 55/24* | (2006.01) |
| *B62D 11/20* | (2006.01) |
| *B62D 55/065* | (2006.01) |
| *B62D 55/12* | (2006.01) |
| *B62D 55/253* | (2006.01) |

(52) U.S. Cl.
CPC ............ *B62D 55/084* (2013.01); *B62D 11/20* (2013.01); *B62D 55/065* (2013.01); *B62D 55/10* (2013.01); *B62D 55/104* (2013.01); *B62D 55/12* (2013.01); *B62D 55/14* (2013.01); *B62D 55/244* (2013.01); *B62D 55/253* (2013.01)

(58) Field of Classification Search
CPC .................................................. B62D 55/084
See application file for complete search history.

(56) References Cited

U.S. PATENT DOCUMENTS

| | | | | |
|---|---|---|---|---|
| 3,650,343 | A * | 3/1972 | Helsell | B62D 11/20 180/9.4 |
| 3,822,755 | A | 7/1974 | Hine | |
| 4,502,560 | A | 3/1985 | Hisatomi | |
| 4,647,116 | A * | 3/1987 | Trask | B60K 17/02 305/132 |
| 5,113,958 | A * | 5/1992 | Holden | B62D 11/20 180/9.1 |
| 6,095,275 | A * | 8/2000 | Shaw | B62K 13/00 180/185 |
| 6,267,392 | B1 | 7/2001 | Noble | |
| 6,991,056 | B2 | 1/2006 | Roberts et al. | |
| 7,090,229 | B2 | 7/2006 | Monsrud | |
| 7,404,608 | B2 * | 7/2008 | Plante | B62D 55/088 305/108 |
| 7,712,557 | B2 * | 5/2010 | Duceppe | B62D 15/00 180/9.21 |

(Continued)

OTHER PUBLICATIONS

International Search Report and Written Opinion dated Nov. 8, 2016 in connection with International Patent Application PCT/CA2016/051005, 9 pages.

(Continued)

*Primary Examiner* — Minnah L Seoh
*Assistant Examiner* — Harold Eric Pahlck, III
(74) *Attorney, Agent, or Firm* — Smart & Biggar LLP

(57) ABSTRACT

A track system for a vehicle (e.g., an all-terrain vehicle (ATV)) in which the track system is configured to enhance traction, floatation, and/or other aspects of its performance, such as, for example, to maintain proper contact with the ground (e.g., even if it is cambered) and/or to better absorb shocks when it encounters obstacles on the ground.

66 Claims, 35 Drawing Sheets

(56) References Cited

U.S. PATENT DOCUMENTS

| | | | | |
|---|---|---|---|---|
| 7,900,723 B2* | 3/2011 | Brazier | ................ | B62D 55/244 |
| | | | | 180/9.44 |
| 8,042,629 B2* | 10/2011 | Mackenzie | ............ | B62D 55/10 |
| | | | | 180/9.21 |
| 8,240,782 B2* | 8/2012 | Bessette | ............... | B62D 55/084 |
| | | | | 305/131 |
| 8,636,326 B2* | 1/2014 | Inaoka | ............... | B62D 49/0635 |
| | | | | 305/125 |
| 8,955,925 B2* | 2/2015 | Bessette | ................ | B62D 55/14 |
| | | | | 180/9.1 |
| 9,828,048 B2* | 11/2017 | Brazier | .................. | B62D 55/14 |
| 9,855,985 B2* | 1/2018 | Jee | ......................... | B62D 55/26 |
| 9,981,703 B2* | 5/2018 | Morin | .................... | B62D 55/04 |
| 2010/0148573 A1* | 6/2010 | Inaoka | .................. | B62D 55/30 |
| | | | | 305/125 |
| 2014/0103704 A1* | 4/2014 | Zuchoski | ............... | B62D 55/12 |
| | | | | 305/142 |
| 2015/0034404 A1 | 2/2015 | Polakowski et al. | | |
| 2015/0166143 A1 | 6/2015 | Beavis | | |
| 2016/0362151 A1* | 12/2016 | Jee | ......................... | B62D 55/26 |
| 2018/0346040 A1* | 12/2018 | Grenzi | .................. | B62D 55/12 |

OTHER PUBLICATIONS

International Search Report and Written Opinion dated Feb. 3, 2017 in connection with International Patent Application PCT/CA2016/051004, 4 pages.

International Search Report and Written Opinion dated Nov. 10, 2016 in connection with International Patent Application PCT/CA2016/051004, 5 pages.

* cited by examiner

TRACK SYSTEM FOR A VEHICLE

FIELD

This disclosure relates generally to off-road vehicles (e.g., all-terrain vehicles (ATVs), agricultural vehicles, etc.) and, more particularly, to track systems for such vehicles.

BACKGROUND

Certain off-road vehicles may be equipped with track systems which enhance their traction and/or floatation on soft, slippery and/or irregular grounds (e.g., soil, mud, sand, ice, snow, etc.) on which they operate.

For example, an all-terrain vehicle (ATV) may be equipped with track systems in place of ground-engaging wheels with tires for which it may have been originally designed. While this may help for traction and/or floatation of the ATV, the track systems may experience issues because they are different (e.g., in geometry, size, structure, behavior, etc.) from the ground-engaging wheels for which the ATV may have been originally designed. For instance, the ATV may be set up so that its ground-engaging wheels are cambered (e.g., have a positive or negative camber), but the track systems may not account for this, which may detrimentally affect performance of the track systems, such as by altering a "contact patch" (i.e., an area of contact) of each track system with the ground in ways that can be adverse to steerability and/or manoeuvrability of the ATV.

Similar considerations may arise for track systems of other types of off-road vehicles (e.g., agricultural vehicles, etc.) in certain situations.

For these and other reasons, there is a need to improve track systems for vehicles.

SUMMARY

According to various aspects, this disclosure relates to a track system for a vehicle in which the track system is configured to enhance traction, floatation, and/or other aspects of its performance, such as, for example, to maintain proper contact with the ground (e.g., even if it is cambered) and/or to better absorb shocks when it encounters obstacles on the ground.

For example, according to an aspect, this disclosure relates to a track system for a vehicle. The track system includes a track including a ground-engaging outer surface for engaging the ground and an inner surface opposite to the ground-engaging outer surface; and a track-engaging assembly configured to move the track around the track-engaging assembly. An area of contact between the track-engaging assembly and a bottom run of the track spans less than half of a width of the track in a widthwise direction of the track system at a cross-section of the track-engaging assembly where the track-engaging assembly contacts the bottom run of the track.

According to another aspect, this disclosure relates to a track system for a vehicle. The track system includes a track including a ground-engaging outer surface for engaging the ground and an inner surface opposite to the ground-engaging outer surface; and a track-engaging assembly configured to move the track around the track-engaging assembly. An area of contact between the track-engaging assembly and a bottom run of the track spans less than half of a width of the track in a widthwise direction of the track system at every cross-section of the track-engaging assembly where the track-engaging assembly contacts the bottom run of the track.

According to another aspect, this disclosure relates to a track system for a vehicle. The track system includes a track including a ground-engaging outer surface for engaging the ground and an inner surface opposite to the ground-engaging outer surface; and a track-engaging assembly configured to move the track around the track-engaging assembly. The track-engaging assembly includes a drive wheel for driving the track and a plurality of idler wheels contacting a bottom run of the track. An area of contact between the track-engaging assembly and a bottom run of the track spans less than half of a width of the track in a widthwise direction of the track system at cross-sections of the track-engaging assembly where respective ones of the idler wheels contact the bottom run of the track.

According to another aspect, this disclosure relates to a track system for a vehicle. The track system includes a track including a ground-engaging outer surface for engaging the ground and an inner surface opposite to the ground-engaging outer surface; and a track-engaging assembly configured to move the track around the track-engaging assembly. The track-engaging assembly includes a drive wheel for driving the track, a plurality of idler wheels contacting a bottom run of the track, and a frame supporting the idler wheels. The frame includes a longitudinal base carrying the idler wheels. A given one of the idler wheels is contained within the longitudinal base of the frame of the track-engaging assembly in a widthwise direction of the track system.

According to another aspect, this disclosure relates to a track system for a vehicle. The track system includes a track including a ground-engaging outer surface for engaging the ground and an inner surface opposite to the ground-engaging outer surface; and a track-engaging assembly configured to move the track around the track-engaging assembly. The track-engaging assembly includes a drive wheel for driving the track and a plurality of idler wheels contacting a bottom run of the track. The idler wheels include a leading idler wheel and a trailing idler wheel spaced from one another in a longitudinal direction of the track system. The leading idler wheel and the trailing idler wheel are centrally disposed in a widthwise direction of the track system such that each of the leading idler wheel and the trailing idler wheel overlaps a centerline of the track that bisects the track in the widthwise direction of the track.

According to another aspect, this disclosure relates to a track system for a vehicle. The track system includes: a track including a ground-engaging outer surface for engaging the ground and an inner surface opposite to the ground-engaging outer surface; and a track-engaging assembly configured to move the track around the track-engaging assembly. The track-engaging assembly includes a track-engaging member engaging a bottom run of the track at a cross-section of the track-engaging assembly and is free of contact with the bottom run of the track from the track-engaging member to lateral edges of the track at the cross-section of the track-engaging assembly.

According to another aspect, this disclosure relates to a track system for a vehicle. The track system includes: a track including a ground-engaging outer surface for engaging the ground and an inner surface opposite to the ground-engaging outer surface; and a track-engaging assembly configured to move the track around the track-engaging assembly. The track-engaging assembly is configured such that every part of the track-engaging assembly that contacts a bottom run of the track remains in contact with the bottom run of the track even if the track system is cambered.

According to another aspect, this disclosure relates to a track system for a vehicle. The track system includes: a track including a ground-engaging outer surface for engaging the ground and an inner surface opposite to the ground-engaging outer surface; and a track-engaging assembly configured to move the track around the track-engaging assembly. The track-engaging assembly comprises a drive wheel for driving the track and a plurality of idler wheels contacting a bottom run of the track. The track-engaging assembly is configured such that every idler wheel remains in contact with the bottom run of the track even if the track system is cambered.

These and other aspects of this disclosure will now become apparent to those of ordinary skill in the art upon review of the following description of embodiments in conjunction with the accompanying drawings.

BRIEF DESCRIPTION OF THE DRAWINGS

A detailed description of embodiments is provided below, by way of example only, with reference to the accompanying drawings, in which.

It is to be expressly understood that the description and drawings are only for the purpose of illustrating certain embodiments, are an aid for understanding, and are not limiting.

DETAILED DESCRIPTION OF EMBODIMENTS

Figure 1A:
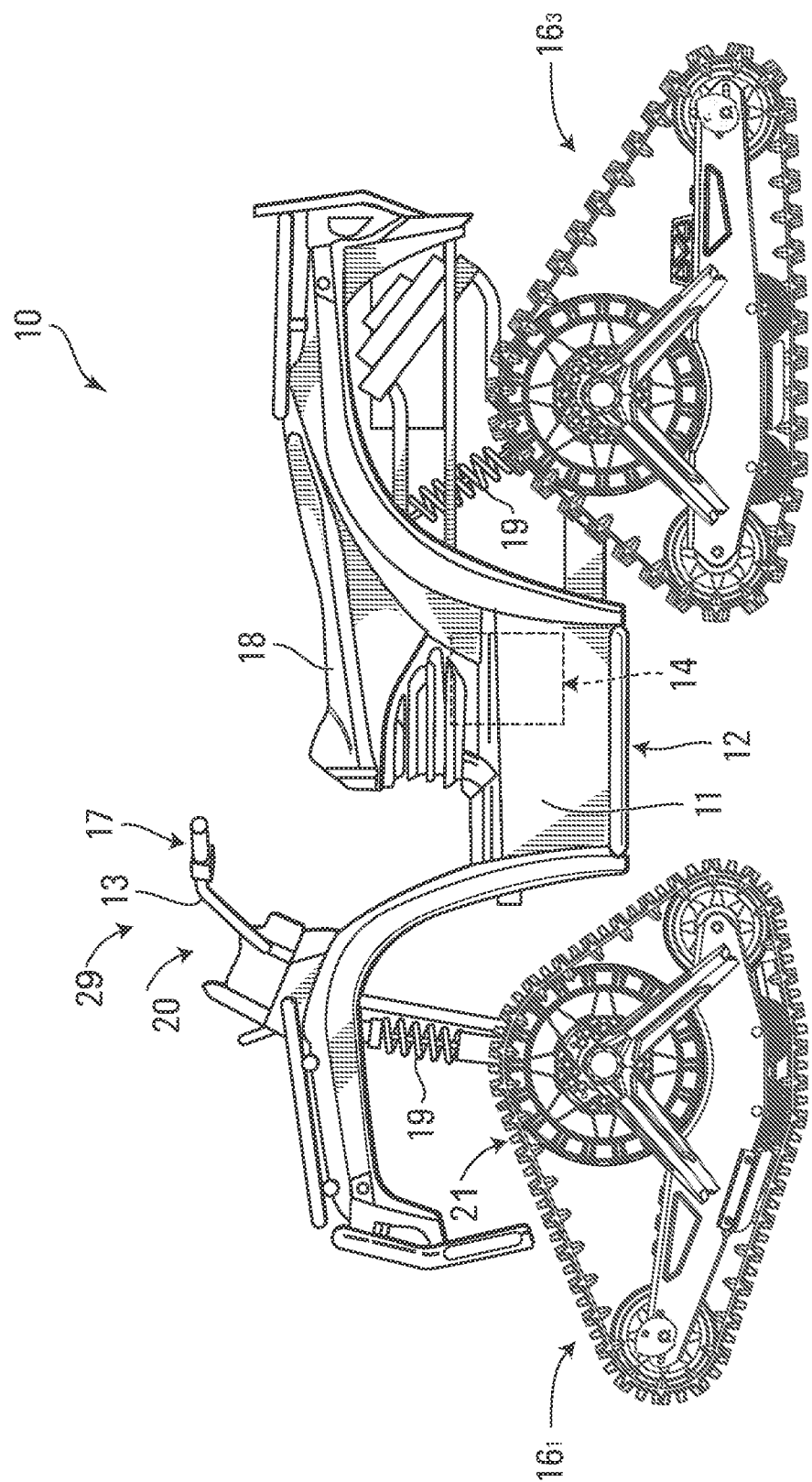
FIGS. 1A and 1B show an example of an embodiment of an all-terrain vehicle (ATV) comprising track systems.
Figure 1B:
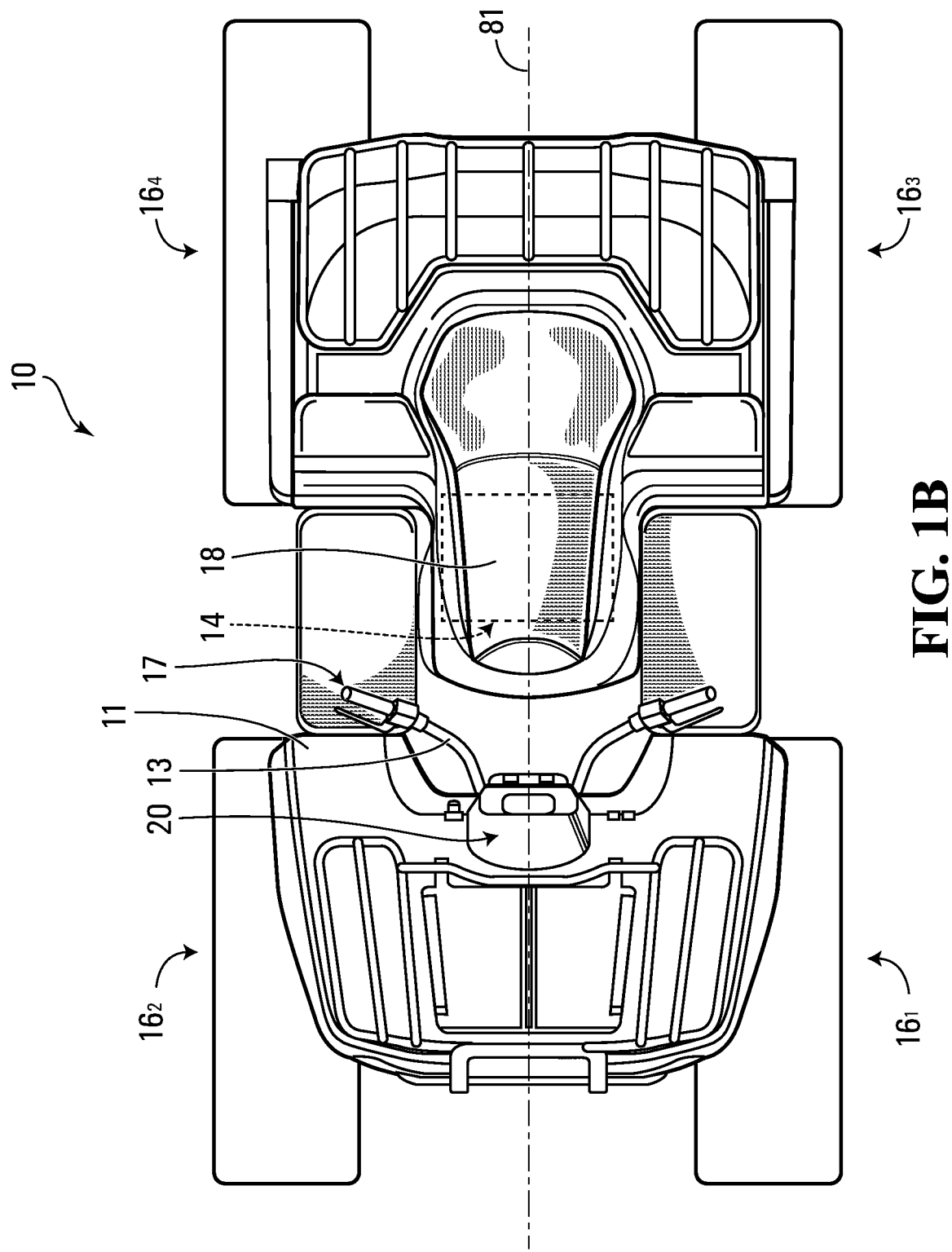

FIGS. 1A and 1B show an example of an embodiment of a tracked vehicle 10 comprising a plurality of track systems $16_1$-$16_4$. In this embodiment, the vehicle 10 is an all-terrain vehicle (ATV), which is a small open vehicle designed to travel off-road on a variety of terrains, including roadless rugged terrain, for recreational, utility and/or other purposes.

In this embodiment, the ATV 10 comprises a frame 11, a powertrain 12, a steering system 17, a suspension 19, the track systems $16_1$-$16_4$, a seat 18, and a user interface 20, which enable a user of the ATV to ride the ATV 10 on the ground. The ATV 10 has a longitudinal direction, a widthwise direction, and a height direction.

As further discussed later, in this embodiment, each of the track systems $16_1$-$16_4$ is configured to enhance traction, floatation, and/or other aspects of its performance, including to maintain proper contact with the ground (e.g., even if it cambered) and/or to better absorb shocks when it encounters obstacles on the ground.

The powertrain 12 is configured for generating motive power and transmitting motive power to the track systems $16_1$-$16_4$ to propel the ATV 10 on the ground. To that end, the powertrain 12 comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). The prime mover 14 is in a driving relationship with one or more of the track systems $16_1$-$16_4$. That is, the powertrain 12 transmits motive power generated by the prime mover 14 to one or more of the track systems $16_1$-$16_4$ (e.g., via a transmission and/or a differential) in order to drive (i.e., impart motion to) these one or more of the track systems $16_1$-$16_2$.

The steering system 17 is configured to enable the user to steer the ATV 10 on the ground. To that end, the steering system 17 comprises a steering device 13 that is operable by the user to direct the ATV 10 along a desired course on the ground. In this embodiment, the steering device 13 comprises handlebars. The steering device 13 may comprise a steering wheel or any other steering component that can be operated by the user to steer the ATV 10 in other embodiments. The steering system 17 responds to the user interacting with the steering device 13 by turning some of the track systems $16_1$-$16_4$ to change their orientation relative to the frame 11 of the ATV 10 in order to cause the ATV 10 to move in a desired direction. In this example, front ones of the track systems $16_1$-$16_4$ are steerable (i.e., turnable) in response to input of the user at the steering device 13 to change their orientation relative to the frame 11 of the ATV 10 in order to steer the ATV 10 on the ground. More particularly, in this example, each of the front ones of the track systems $16_1$-$16_4$ is pivotable about a steering axis 29 of the ATV 10 in response to input of the user at the steering device 10 in order to steer the ATV 10 on the ground. Rear ones of the track systems $16_1$-$16_4$ are not turned relative to the frame 11 of the ATV 10 by the steering system 17.

The suspension 19 is connected between the frame 11 and the track systems $16_1$-$16_4$ to allow relative motion between the frame 11 and the track systems $16_1$-$16_4$ as the ATV 10 travels on the ground. The suspension 19 enhances handling of the ATV 10 on the ground by absorbing shocks and helping to maintain traction between the track systems $16_1$-$16_4$ and the ground. The suspension 19 may comprise an arrangement of springs and dampers. A spring may be a coil spring, a leaf spring, a gas spring (e.g., an air spring), or any other elastic object used to store mechanical energy. A damper (also sometimes referred to as a "shock absorber") may be a fluidic damper (e.g., a pneumatic damper, a hydraulic damper, etc.), a magnetic damper, or any other object which absorbs or dissipates kinetic energy to decrease oscillations. In some cases, a single device may itself constitute both a spring and a damper (e.g., a hydropneumatic, hydrolastic, or hydragas suspension device).

In this embodiment, the seat 18 is a straddle seat and the ATV 10 is usable by a single person such that the seat 18 accommodates only that person driving the ATV 10. In other embodiments, the seat 18 may be another type of seat, and/or the ATV 10 may be usable by two individuals, namely one person driving the ATV 10 and a passenger, such that the seat 18 may accommodate both of these individuals (e.g., behind one another or side-by-side) or the ATV 10 may comprise an additional seat for the passenger. For example, in other embodiments, the ATV 10 may be a side-by-side ATV, sometimes referred to as a "utility terrain vehicle" or "utility task vehicle" (UTV).

The user interface 20 allows the user to interact with the ATV 10. More particularly, the user interface 20 comprises an accelerator, a brake control, and the steering device 13 that are operated by the user to control motion of the ATV 10 on the ground. The user interface 20 also comprises an instrument panel (e.g., a dashboard) which provides indicators (e.g., a speedometer indicator, a tachometer indicator, etc.) to convey information to the user.

The track systems $16_1$-$16_4$ engage the ground to provide traction to the ATV 10. More particularly, in this example, the front ones of the track systems $16_1$-$16_4$ provide front traction to the ATV 10 while the rear ones of the track systems $16_1$-$16_4$ provide rear traction to the ATV 10.

Figure 2A:
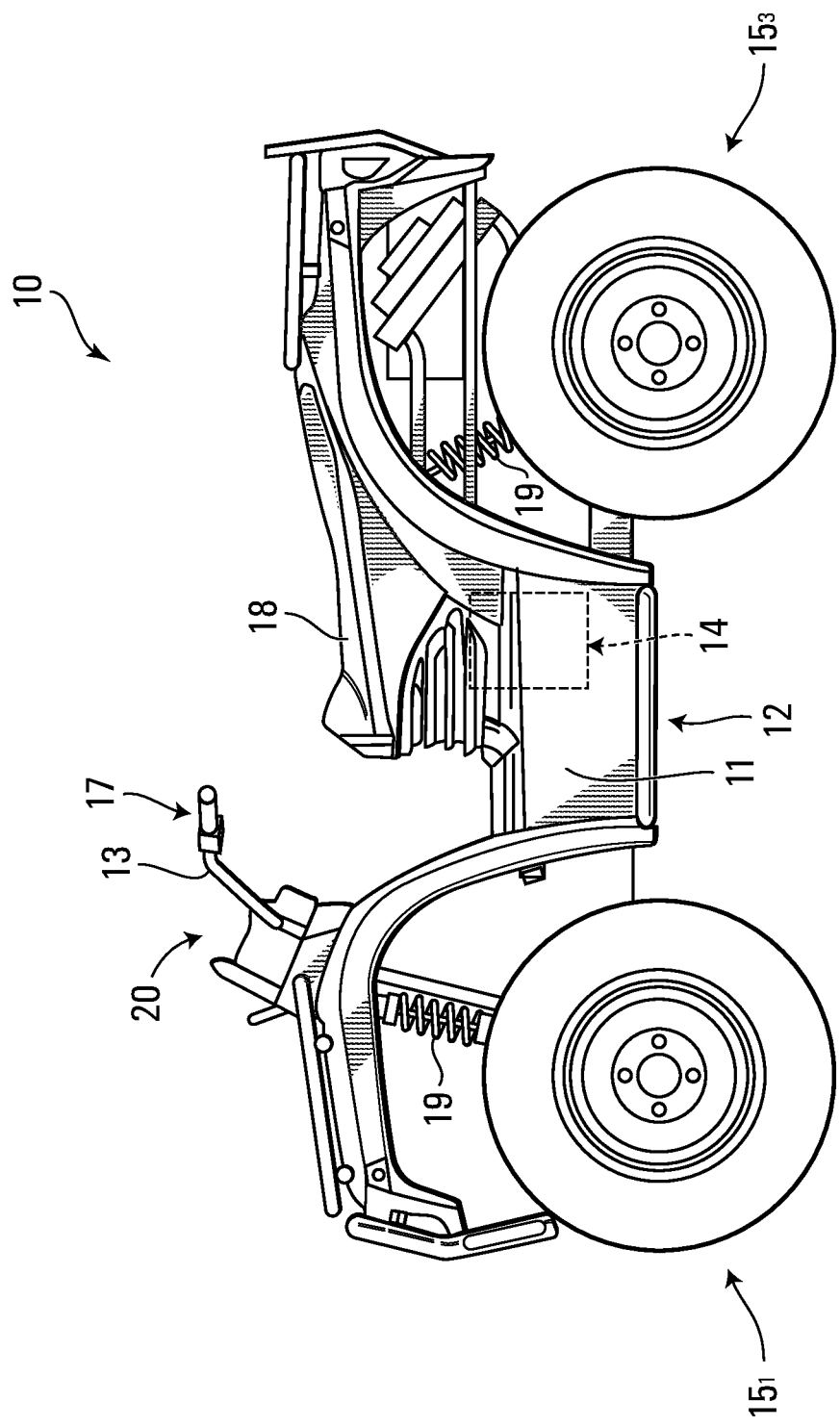
FIGS. 2A and 2B show the ATV equipped with ground-engaging wheels instead of the track systems.
Figure 2B:
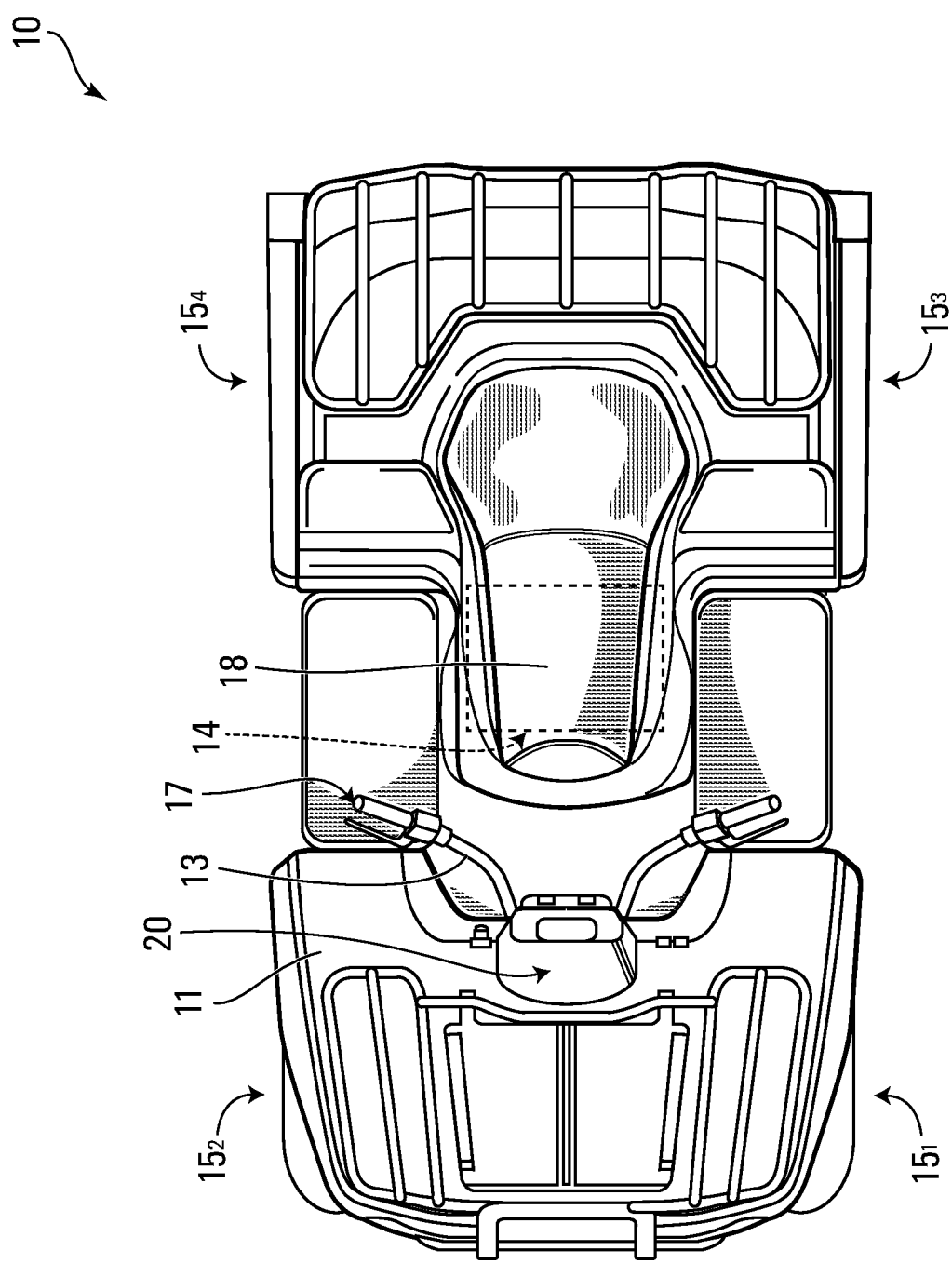
Figure 3:
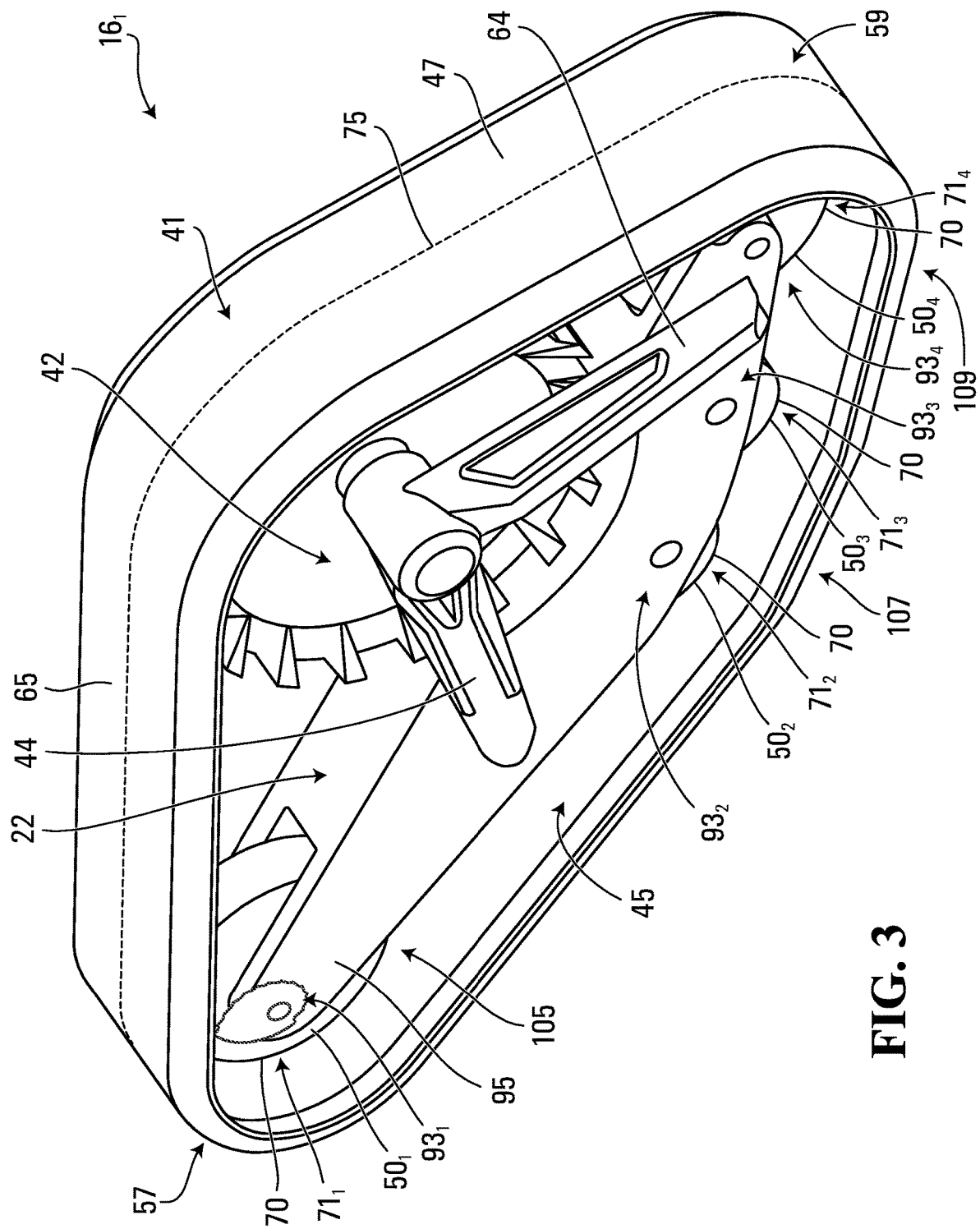
FIGS. 3 and 4 respectively show perspective and side views of a track system of the track systems.
Figure 4:
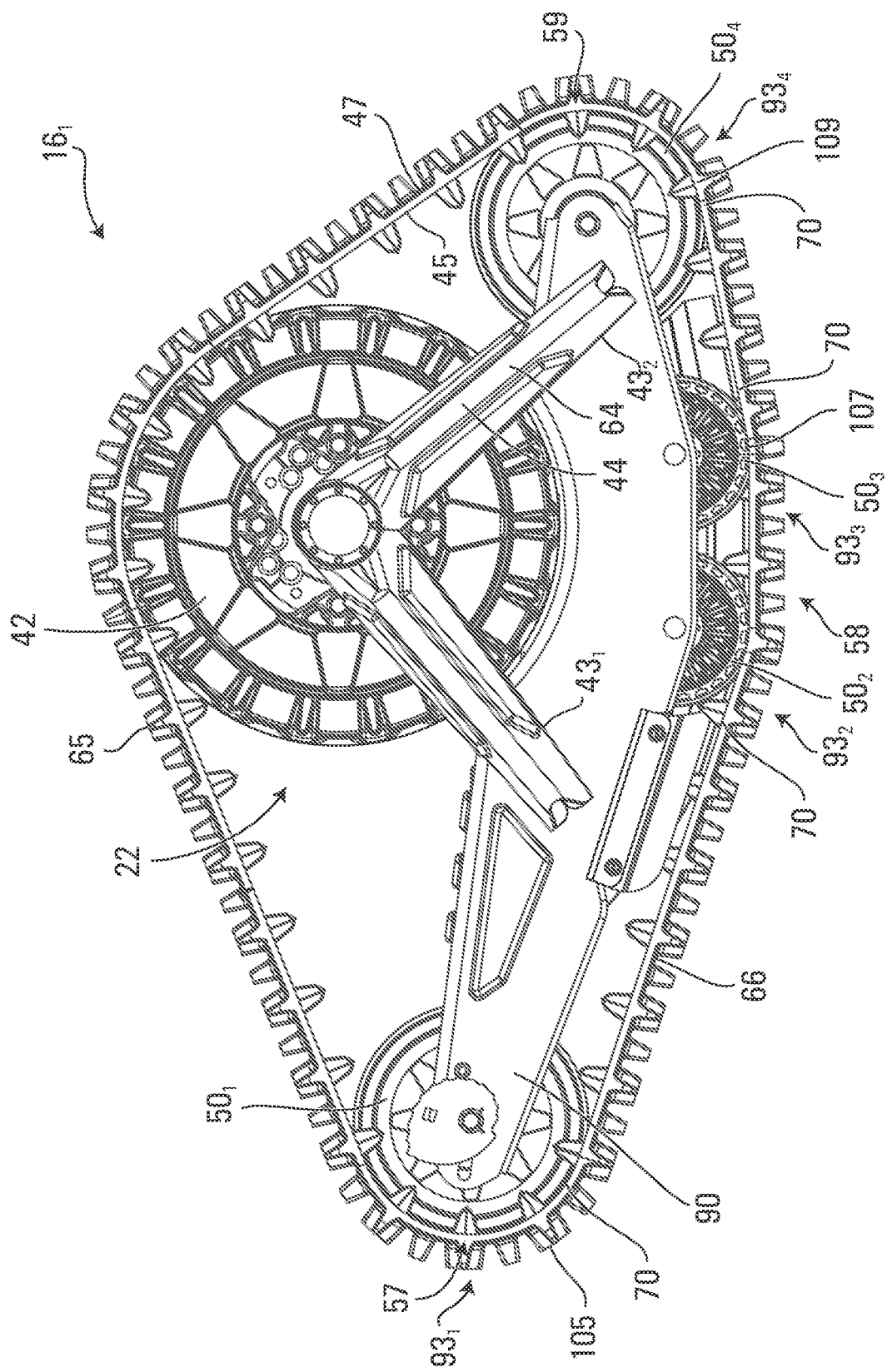
Figure 5:
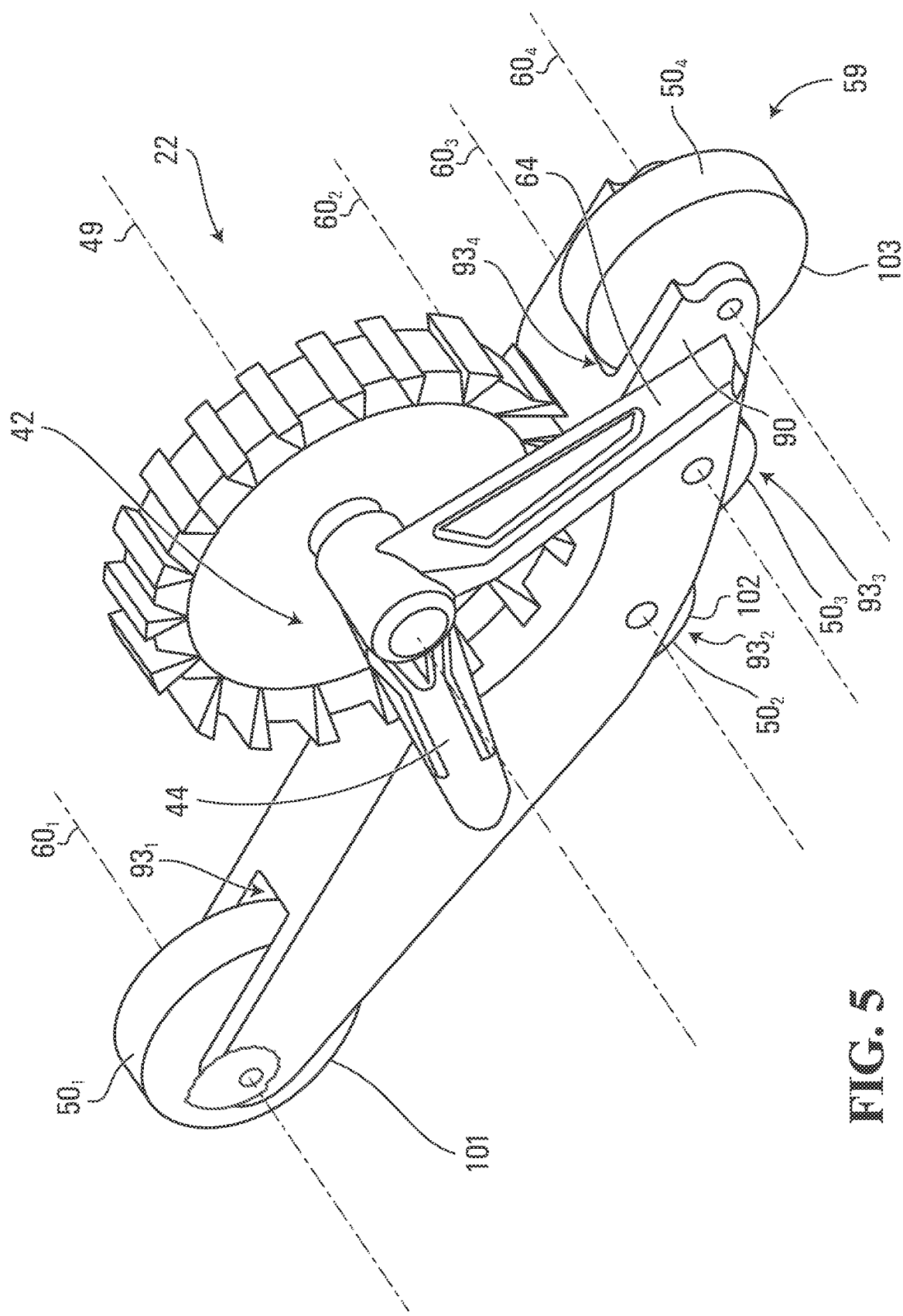
FIGS. 5 and 6 respectively show perspective and side views of the track system without its track.
Figure 6:
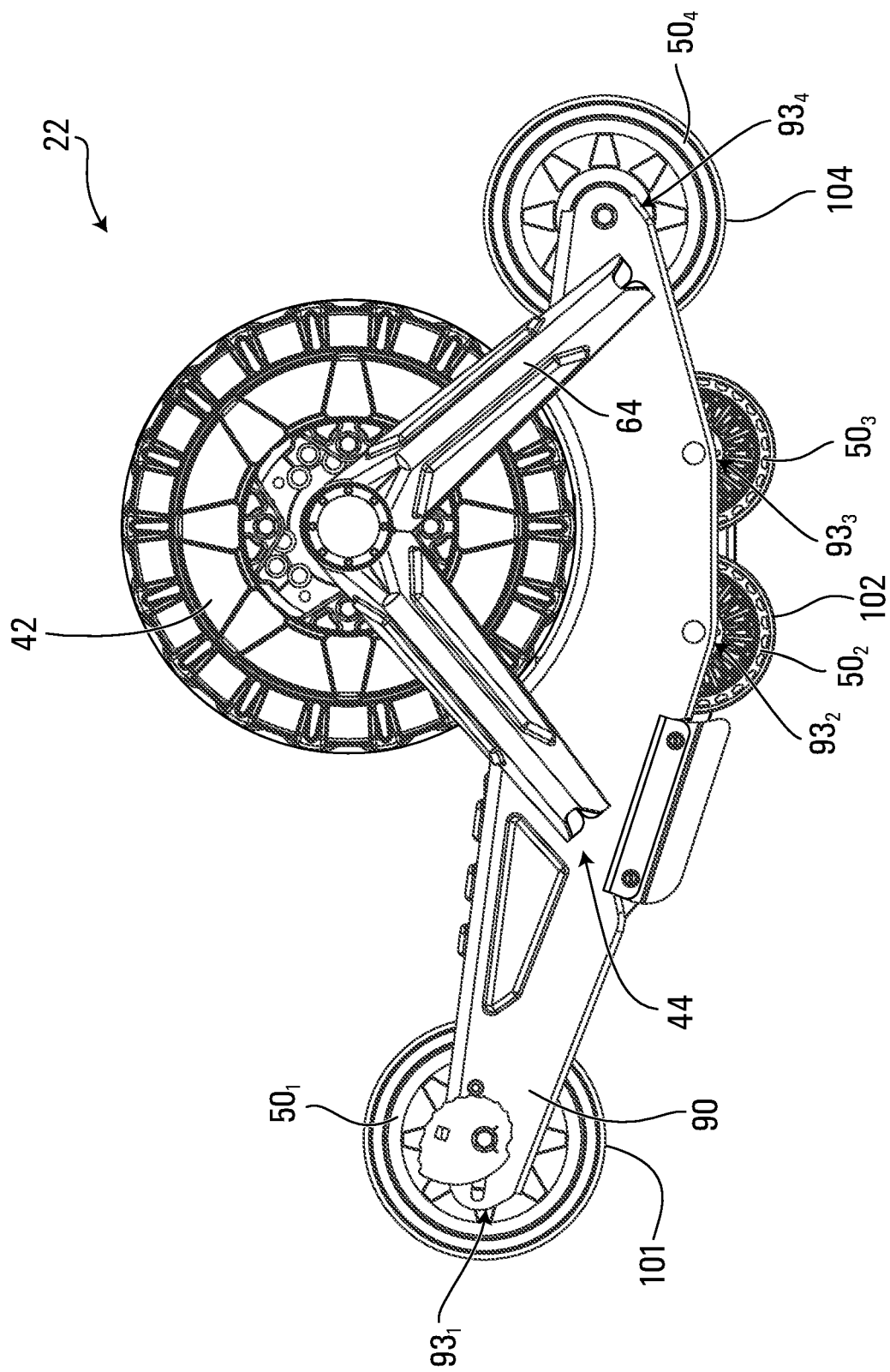
Figure 7:
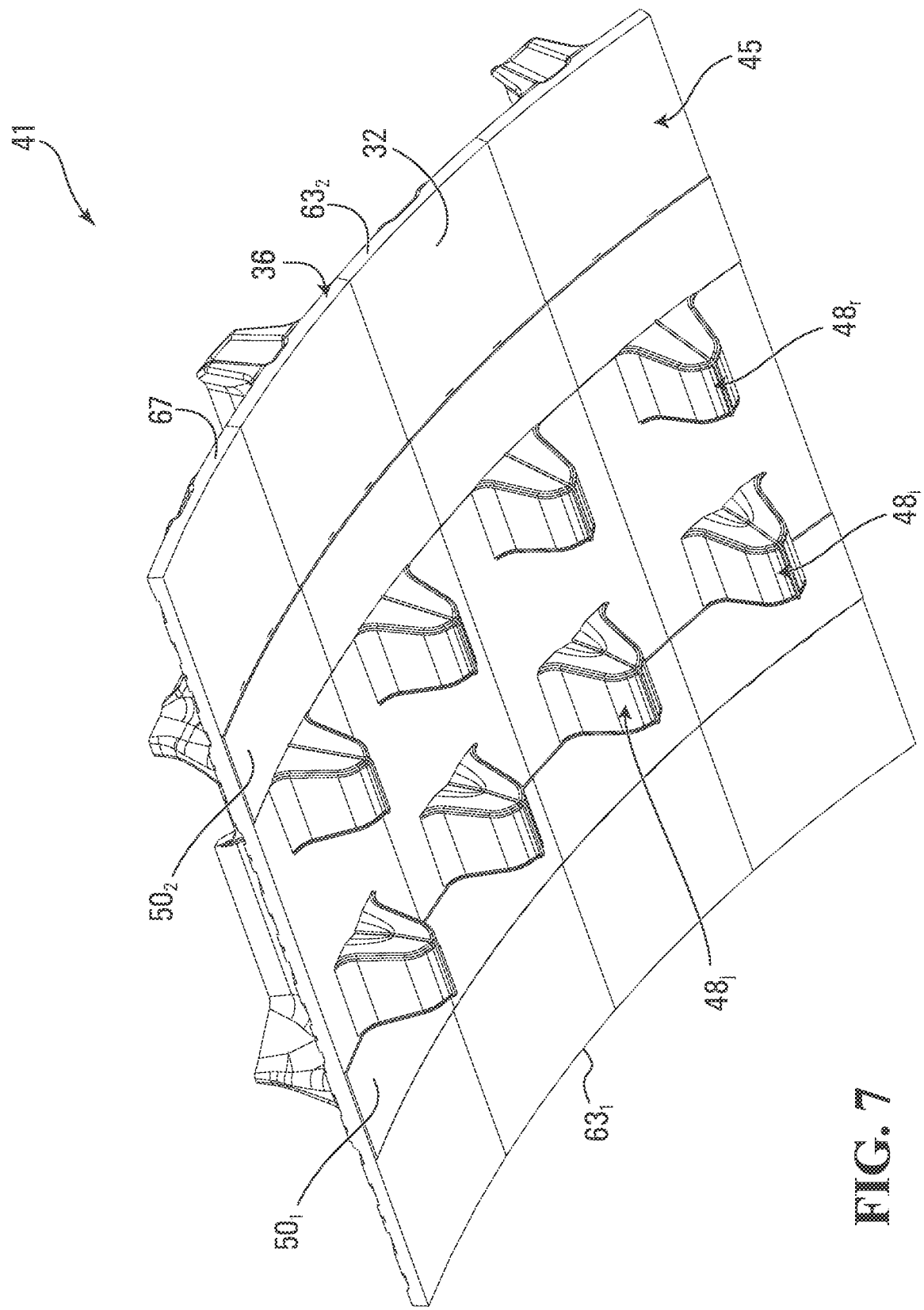
FIGS. 7 and 8 show perspective views of a segment of the track of the track system, which depict features of an inner side and a ground-engaging outer side of the track.
Figure 8:
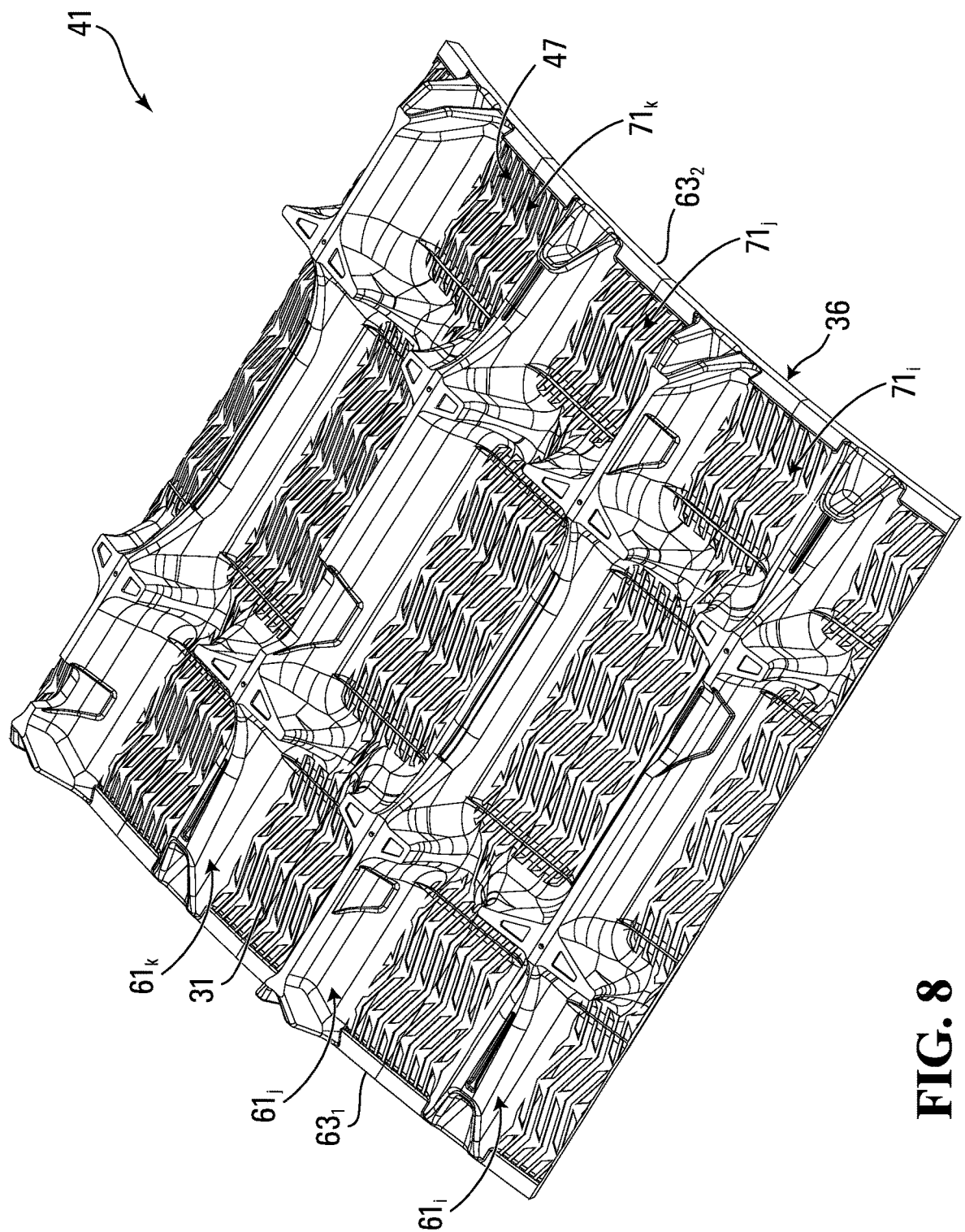
Figure 9:
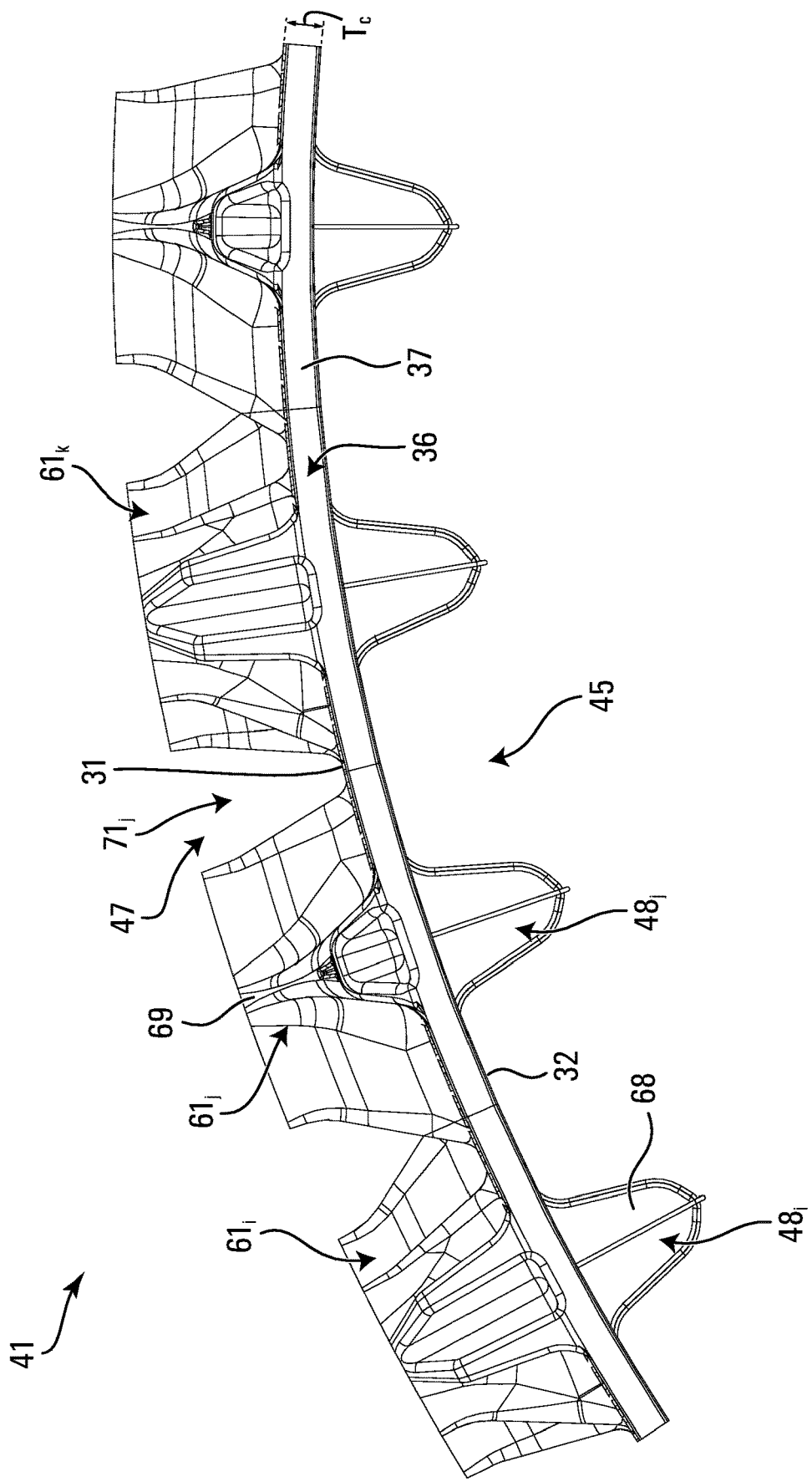
FIG. 9 shows a side view of the track of the track system.
Figure 10:
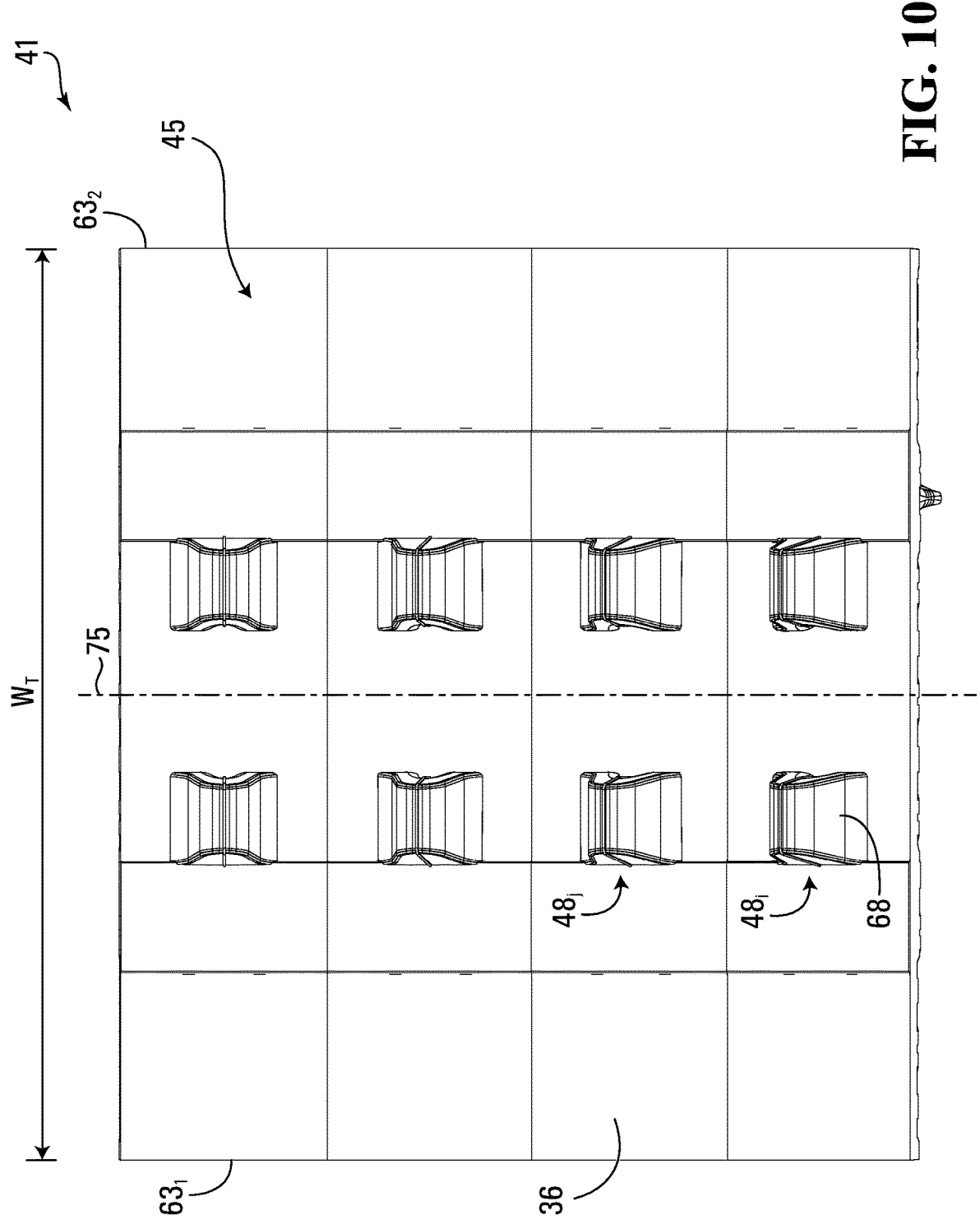
FIG. 10 shows a plan view of the inner side of the track of the track system.
Figure 11:
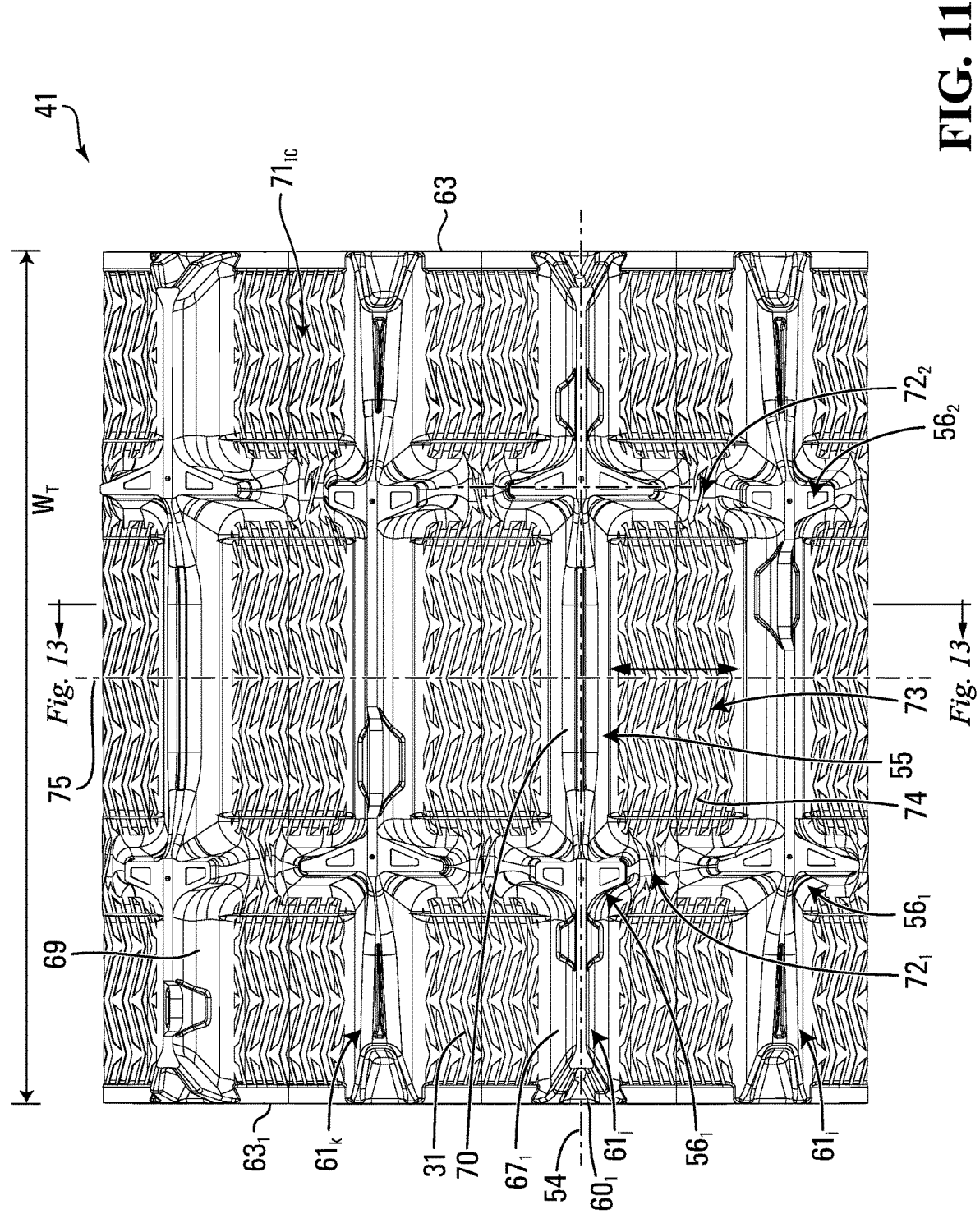
FIG. 11 shows a plan view of the outer side of the track of the track system.

In this embodiment, as shown in FIGS. 2A and 2B, each of the track systems $16_1$-$16_4$ is mounted in place of a respective one of a plurality of ground-engaging wheels $15_1$-$15_4$ having tires with which the ATV 10 may equipped. Basically, in this embodiment, the track systems $16_1$-$16_4$ may be used to convert the ATV 10 from a wheeled vehicle into a tracked vehicle, thereby enhancing its traction and floatation on the ground.

With additional reference to FIGS. 3 to 6, in this embodiment, each track system $16_i$ comprises a track 41 and a track-engaging assembly 22 to move the track 41 around the track-engaging assembly 22. In this example, the track-engaging assembly 22 comprises a frame 44 and a plurality of track-contacting wheels which includes a drive wheel 42 and a plurality of idler wheels $50_1$-$50_4$. The track system $16_i$ has a front longitudinal end 57 and a rear longitudinal end 59 that define a length of the track system $16_i$. A width of the track system $16_i$ is defined by a width $W_T$ of the track 41. An envelope of the track system $16_i$ is defined by a length of the track 41. The track system $16_i$ has a longitudinal direction, a widthwise direction (i.e., a lateral direction), and a height direction.

The track 41 engages the ground to provide traction to the ATV 10. The length of the track 41 allows the track 41 to be mounted around the track-engaging assembly 22. In view of its closed configuration without ends that allows it to be disposed and moved around the track-engaging assembly 22, the track 41 can be referred to as an "endless" track. Referring additionally to FIGS. 7 to 11, the track 41 comprises an inner side 45 facing the wheels 42, $50_1$-$50_4$ and a ground-engaging outer side 47 opposite the inner side 45 for engaging the ground. Lateral edges $63_1$, $63_2$ of the track 41 define the track's width $W_T$. The track 41 has a top run 65 which extends between the longitudinal ends 57, 59 of the track system $16_i$ and over the wheels 42, $50_1$-$50_4$ and a bottom run 66 which extends between the longitudinal ends 57, 59 of the track system $16_i$ and under the wheels 42, $50_1$-$50_4$. The bottom run 66 of the track 41 defines an area of contact 58 of the track 41 with the ground which generates traction and bears a majority of a load on the track system $16_i$, and which will be referred to as a "contact patch" of the track 41 with the ground. The track 41 has a longitudinal direction, a widthwise direction (i.e., a lateral direction), and a thickness direction.

The track 41 is elastomeric in that it comprises elastomeric material allowing it to flex around the wheels 42, $50_1$-$50_4$. The elastomeric material of the track 41 can include any polymeric material with suitable elasticity. In this embodiment, the elastomeric material includes rubber. Various rubber compounds may be used and, in some cases, different rubber compounds may be present in different areas of the track 41. In other embodiments, the elastomeric material of the track 41 may include another elastomer in addition to or instead of rubber (e.g., polyurethane elastomer). The track 41 can be molded into shape in a mold by a molding process during which its elastomeric material is cured.

More particularly, the track 41 comprises an elastomeric belt-shaped body 36 underlying its inner side 45 and its ground-engaging outer side 47. In view of its underlying nature, the body 36 can be referred to as a "carcass". The carcass 36 comprises elastomeric material 37 which allows the track 41 to flex around the wheels 42, $50_1$-$50_4$.

Figure 12:
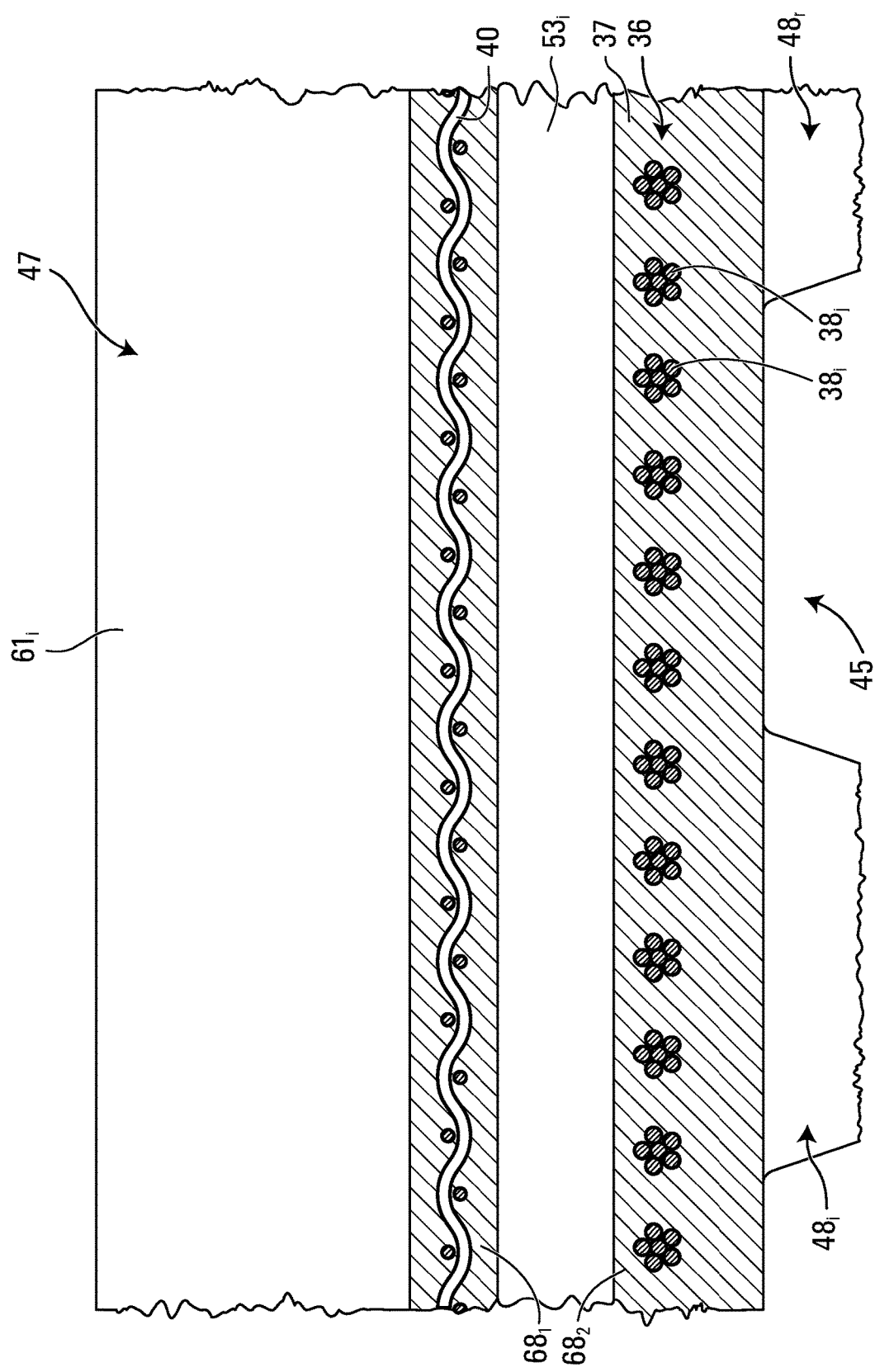
FIGS. 12 and 13 show cross-sectional views of the track of the track system.

As shown in FIG. 12, in some embodiments, the carcass 36 may comprise a plurality of reinforcements $68_1$-$68_R$ (e.g., reinforcing layers) embedded in its elastomeric material 37. One example of a reinforcement $68_i$ is a layer of reinforcing cables $38_1$-$38_C$ that are adjacent and generally parallel to one another. For instance, the reinforcing cables $38_1$-$38_C$ may extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement $68_i$ is a layer of reinforcing fabric 40. Reinforcing fabric comprises pliable material made usually by weaving, felting, knitting, interlacing, or otherwise crossing natural or synthetic elongated fabric elements, such as fibers, filaments, strands and/or others, such that at least some of the elongated fabric elements extend transversally to the longitudinal direction of the track 41 to have a reinforcing effect transversally to the longitudinal direction of the track 41. For instance, a layer of reinforcing fabric may comprise a ply of reinforcing woven fibers (e.g., nylon fibers or other synthetic fibers). Various other types of reinforcements may be provided in the carcass 36 in other embodiments.

The carcass 36 may be molded into shape in the track's molding process during which its elastomeric material 37 is cured. For example, in some embodiments, layers of elastomeric material providing the elastomeric material 37 of the carcass 36, the reinforcing cables $38_1$-$38_C$ and the layer of reinforcing fabric 40 may be placed into the mold and consolidated during molding.

In this embodiment, the inner side 45 of the track 41 comprises an inner surface 32 of the carcass 36 and a plurality of wheel-contacting projections $48_1$-$48_N$ that project from the inner surface 32 to contact at least some of the wheels 42, $50_1$-$50_4$ and that are used to do at least one of driving (i.e., imparting motion to) the track 41 and guiding the track 41. In that sense, the wheel-contacting projections $48_1$-$48_N$ can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs $48_1$-$48_N$ interact with the drive wheel 42 in order to cause the track 41 to be driven, and also interact with the idler wheels $50_1$-$50_4$ in order to guide the track 41 as it is driven by the drive wheel 42. The drive/guide lugs $48_1$-$48_N$ are thus used to both drive the track 41 and guide the track 41 in this embodiment.

The drive/guide lugs $48_1$-$48_N$ are spaced apart along the longitudinal direction of the track 41. In this case, the drive/guide lugs $48_1$-$48_N$ are arranged in a plurality of rows that are spaced apart along the widthwise direction of the track 41. The drive/guide lugs $48_1$-$48_N$ may be arranged in other manners in other embodiments (e.g., a single row or more than two rows). Each of the drive/guide lugs $48_1$-$48_N$ is an elastomeric drive/guide lug in that it comprises elastomeric material 67. The drive/guide lugs $48_1$-$48_N$ can be provided and connected to the carcass 36 in the mold during the track's molding process.

The ground-engaging outer side 47 of the track 41 comprises a ground-engaging outer surface 31 of the carcass 36 and a plurality of traction projections $61_1$-$61_M$ that project from the outer surface 31 and engage and may penetrate into the ground to enhance traction. The traction projections $61_1$-$61_M$, which can sometimes be referred to as "traction lugs" or "traction profiles", are spaced apart in the longitudinal direction of the track system $16_i$. The ground-engaging outer side 47 comprises a plurality of traction-projection-free areas $71_1$-$71_F$ (i.e., areas free of traction projections) between successive ones of the traction projections $61_1$-$61_M$. In this example, each of the traction projections $61_1$-$61_M$ is an elastomeric traction projection in that it comprises elastomeric material 69. The traction projections $61_1$-$61_M$ can be provided and connected to the carcass 36 in the mold during the track's molding process.

Each traction projection $61_i$ extends transversally to the longitudinal direction of the track 41. That is, the traction projection $61_i$ has a longitudinal axis 54 extending transversally to the longitudinal direction of the track 41. In this example, the longitudinal axis 54 of the traction projection $61_i$ is substantially parallel to the widthwise direction of the track 41. In other examples, the longitudinal axis 54 of the traction projection $61_i$ may be transversal to the longitudinal direction of the track 41 without being parallel to the widthwise direction of the track 41. The traction projections $61_1$-$61_M$ may be configured in various other ways in other embodiments.

In this example, the carcass 36 has a thickness $T_c$ which is relatively small. The thickness $T_c$ of the carcass 36 is measured from the inner surface 32 to the ground-engaging outer surface 31 of the carcass 36 between longitudinally-adjacent ones of the traction projections $61_1$-$61_M$. For example, in some embodiments, the thickness $T_c$ of the carcass 36 may be no more than 0.250 inches, in some cases no more than 0.240 inches, in some cases no more than 0.230 inches, in some cases no more than 0.220 inches, in some cases no more than 0.210 inches, in some cases no more than 0.200 inches, and in some cases even less (e.g., 0.180 or 0.170 inches). The thickness $T_c$ of the carcass 36 may have any other suitable value in other embodiments.

Figure 13:
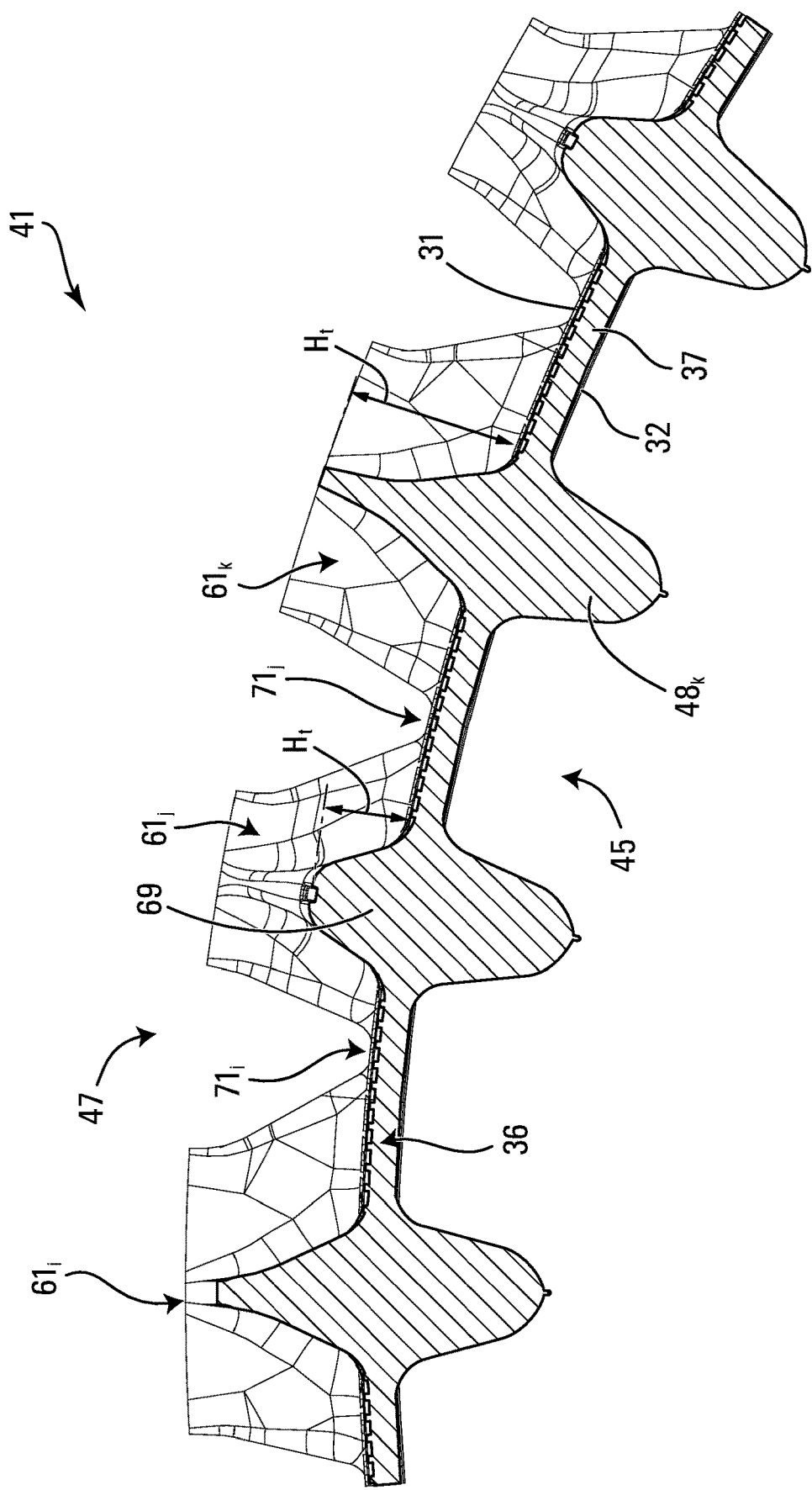
Figure 14:
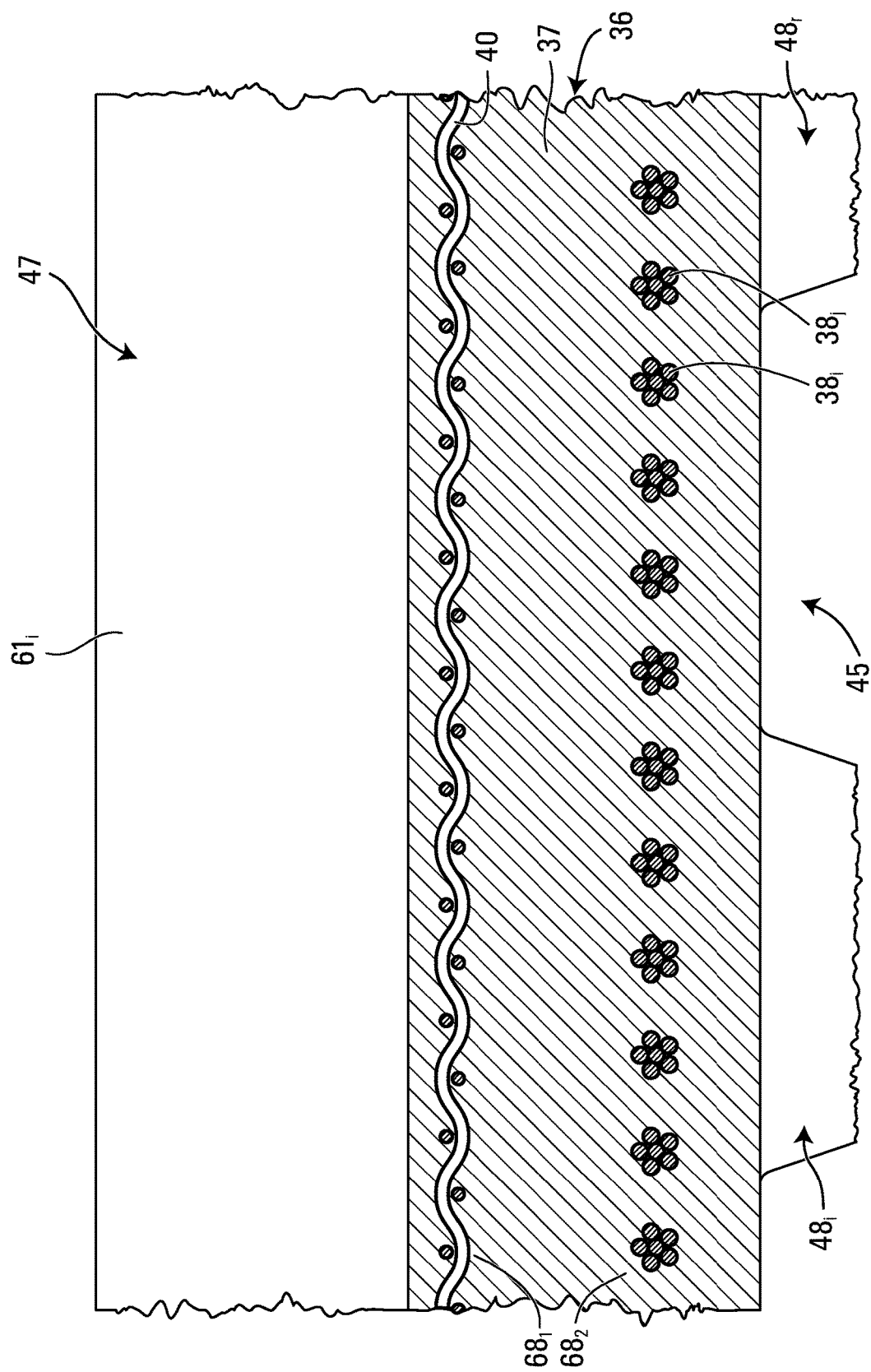
FIGS. 14 and 15 show cross-sectional views of a variant of the track of the track system.
Figure 15:
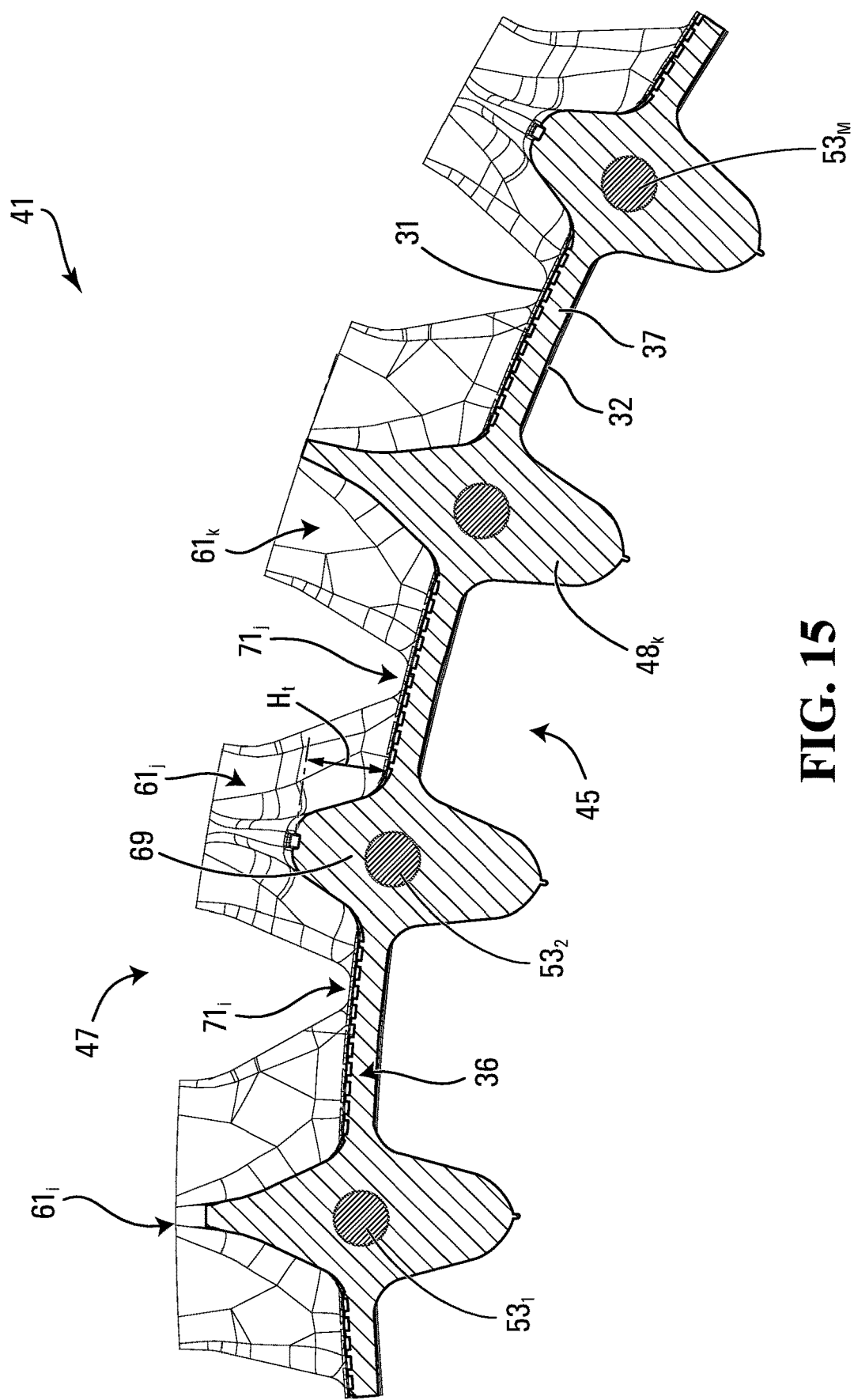
Figure 16:
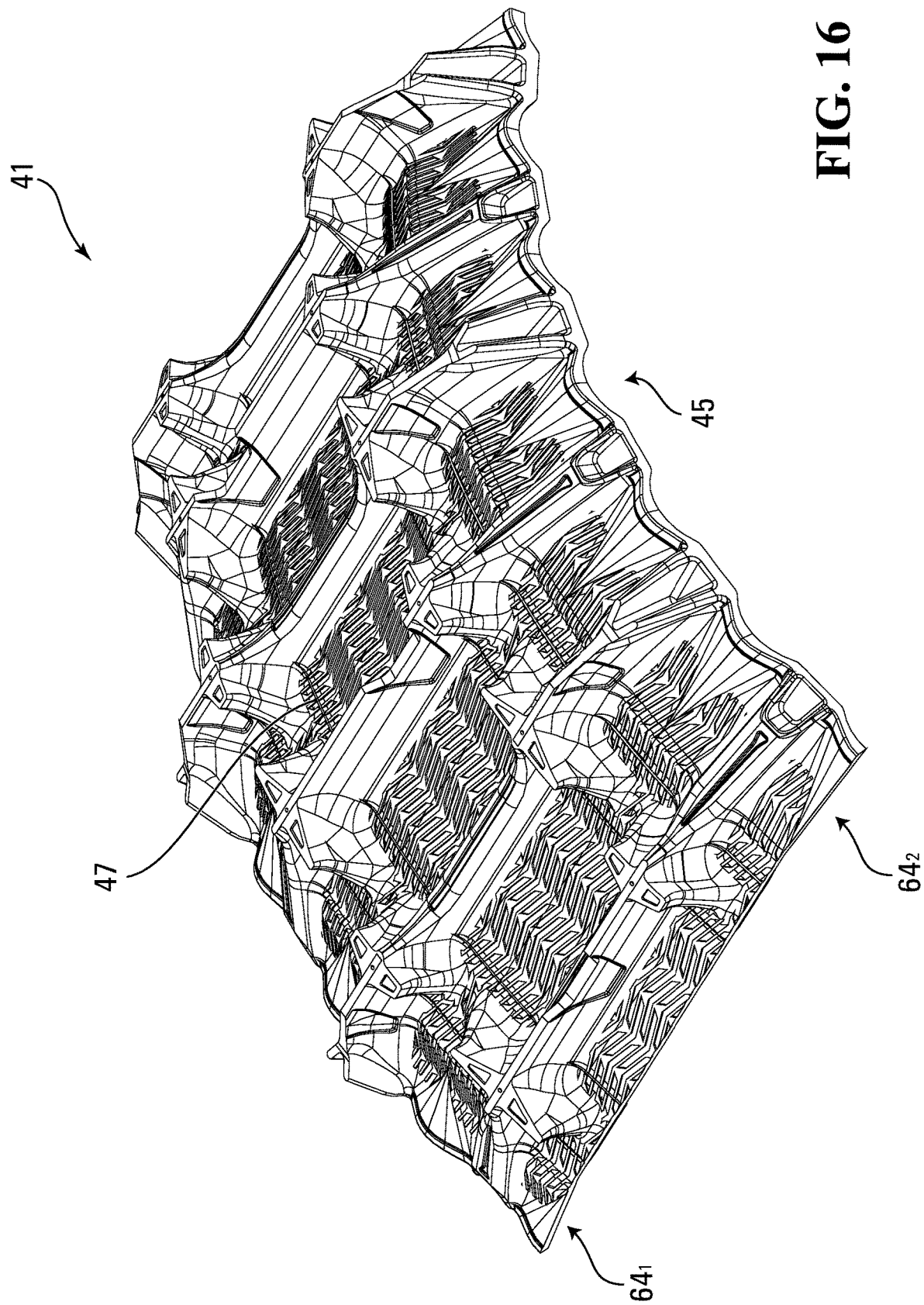
FIGS. 16 to 20 show views of a segment of a variant of the track.
Figure 17:
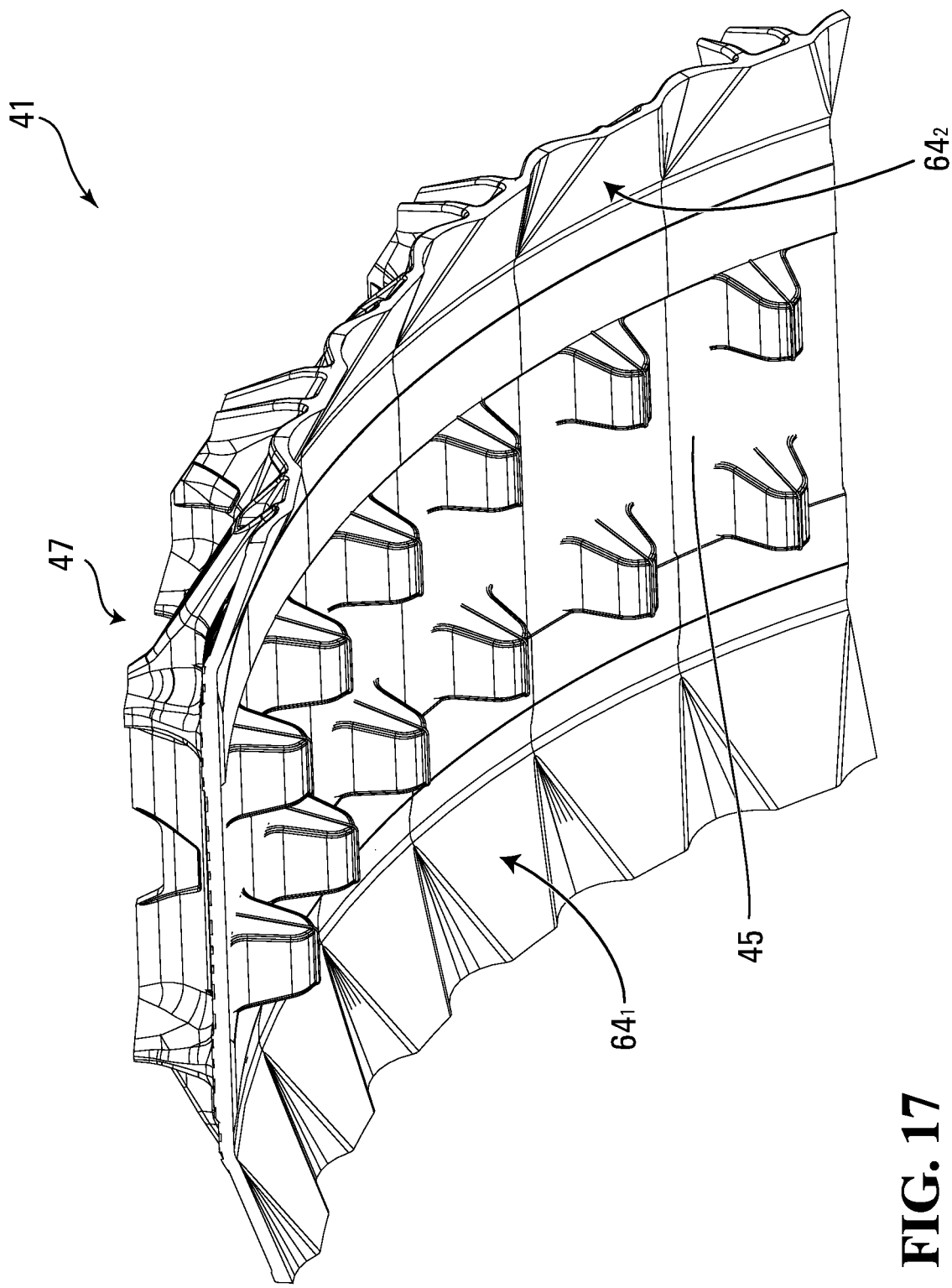
Figure 18:
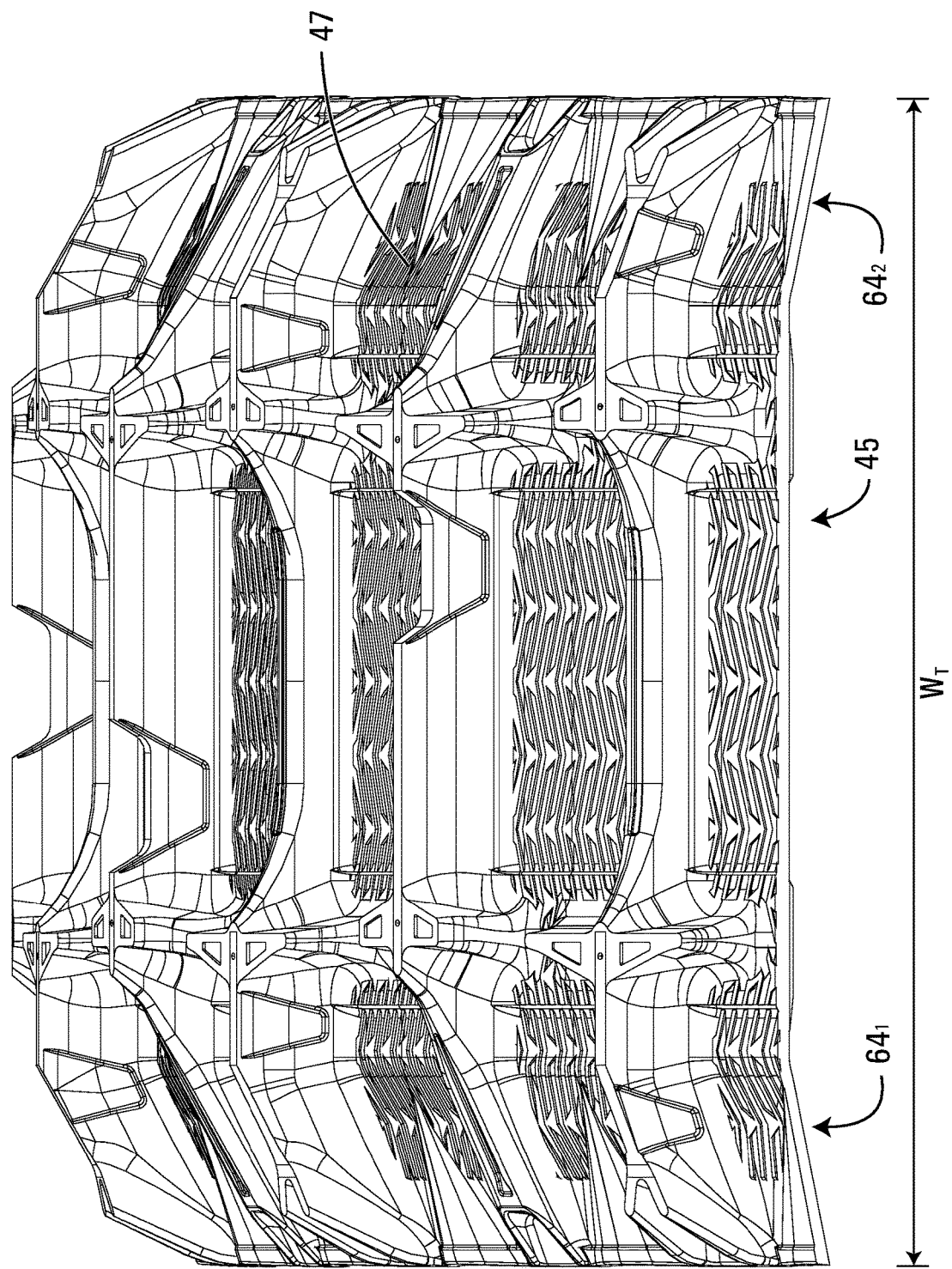
Figure 19:
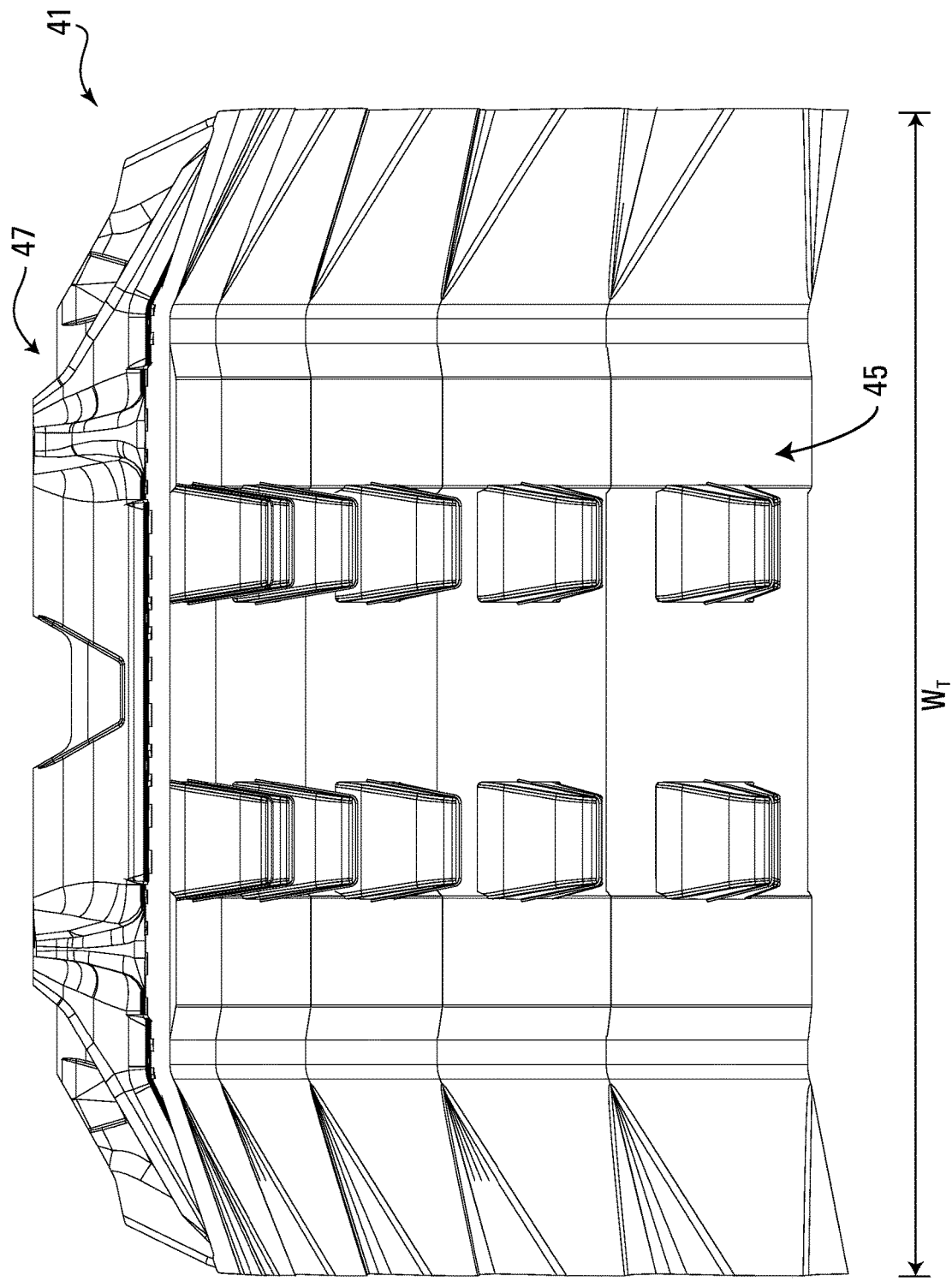
Figure 20:
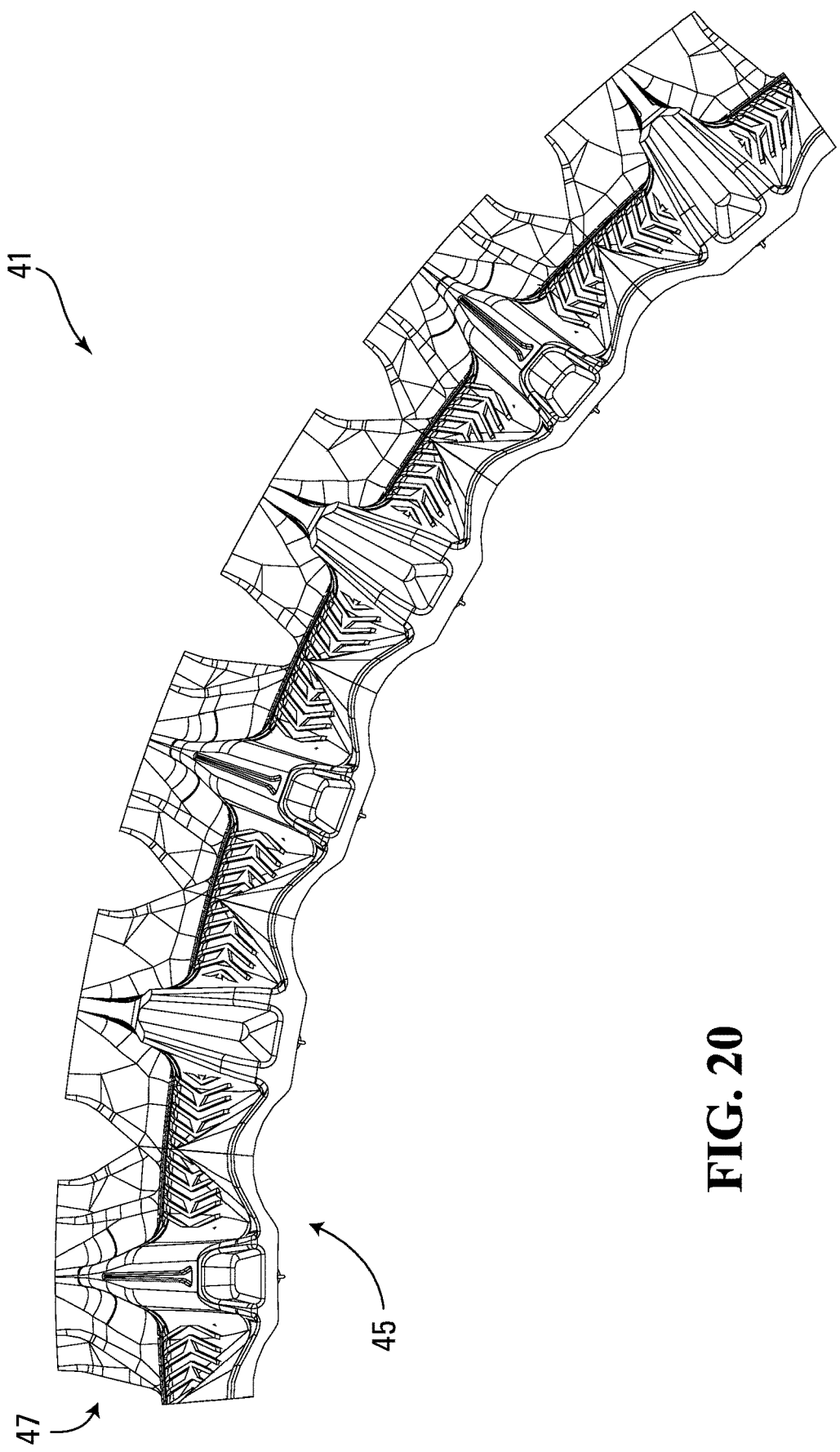

In this embodiment, as shown in FIGS. 12 and 13, the track 41 is free of transversal stiffening rods embedded in its elastomeric material. That is, the track 41 does not comprise transversal stiffening rods embedded in its elastomeric material and extending transversally to its longitudinal direction. FIGS. 14 and 15 shows a variant in which the track 41 may comprise transversal stiffening rods $53_1$-$53_M$ embedded in its elastomeric material and extending transversally to its longitudinal direction in other embodiments. This absence of transversal stiffening rods in some embodiments, such as shown in FIGS. 12 and 13, makes the track 41 more flexible in its widthwise direction than if the track 41 had the transversal stiffening rods $53_1$-$53_M$ but was otherwise identical.

FIGS. 16 to 20 show an example of another embodiment of the track 41 which comprises bent lateral edge portions $64_1$, $64_2$ adjacent its lateral edges $63_1$, $63_2$ to facilitate steering of the track system $16_i$ on the ground, by making the contact patch 58 smaller. For instance, in some embodiments, this may be used for the front ones of the track systems $16_1$-$16_4$. More particularly, the carcass 36 of the track 41 of the track system $16_i$ is bent inwardly proximate the lateral edges $63_1$, $63_2$ of the track 41 such that its inner surface 32 and ground-engaging outer surface 31 are bent inwardly.

The track 41 may be constructed in various other ways in other embodiments. For example, in some embodiments, the track 41 may comprise a plurality of parts (e.g., rubber sections) interconnected to one another in a closed configuration, the track 41 may have recesses or holes that interact with the drive wheel 42 in order to cause the track 41 to be driven (e.g., in which case the drive/guide lugs $48_1$-$48_N$ may be used only to guide the track 41 without being used to drive the track 41), and/or the ground-engaging outer side 47 of the track 41 may comprise various patterns of traction projections.

The drive wheel 42 is rotatable about an axis of rotation 49 for driving the track 41 in response to rotation of an axle 21 of the ATV. In this example, the axis of rotation 49 corresponds to an axis of rotation of the axle 21 of the ATV 10. More particularly, in this example, the drive wheel 42 has a hub which is mounted to the axle 21 of the ATV 10 such that power generated by the prime mover 14 and delivered over the powertrain 12 of the ATV 10 rotates the axle 21, which rotates the drive wheel 42, which imparts motion of the track 41. In this embodiment in which the track system $16_i$ is mounted where a ground-engaging wheel $15_i$ could otherwise be mounted, the axle 21 of the ATV 10 is capable of rotating the drive wheel 42 of the track system $16_i$ or the ground-engaging wheel $15_i$.

In this embodiment, the drive wheel 42 comprises a drive sprocket engaging the drive/guide lugs $48_1$-$48_N$ of the inner side 45 of the track 41 in order to drive the track 41. In this case, the drive sprocket 42 comprises a plurality of teeth $46_1$-$46_T$ distributed circumferentially along its rim to define a plurality of lug-receiving spaces therebetween that receive the drive/guide lugs $48_1$-$48_N$ of the track 41. The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The idler wheels $50_1$-$50_4$ are not driven by power supplied by the prime mover 14, but are rather used to do at least one of supporting part of the weight of the ATV 10 on the ground via the track 41, guiding the track 41 as it is driven by the drive wheel 42, and tensioning the track 41. More particularly, in this embodiment, the idler wheels $50_1$, $50_4$ are respectively a front idler wheel (a leading idler wheel) and a rear idler wheel (a trailing idler wheel) that maintain the track 41 in tension, and can help to support part of the weight of the ATV 10 on the ground via the track 41. The idler wheels $50_2$, $50_3$ are roller wheels that roll on the inner side 45 of the track 41 along the bottom run 66 of the track 41 to apply the bottom run 66 on the ground. The idler wheels $50_1$-$50_4$ move on an idler wheel path 55 of the inner surface 32 of the carcass 36 of the track 41. The idler wheel path 55 extends between respective ones of the drive/guide lugs $48_1$-$48_N$ to allow these lugs to guide motion of the track 41. The idler wheels $50_1$-$50_4$ may be arranged in other configurations and/or the track system $16_i$ may comprise more or less idler wheels in other embodiments.

In this embodiment, the bottom run 66 of the track 41 has a geometry configured to help traction and maneuverability of the track system $16_i$. More particularly, in this embodiment, the front idler wheel $50_1$ is adjacent to the front longitudinal end 57 of the track system $16_i$, the rear idler wheel $50_4$ is adjacent to the rear longitudinal end 59 of the track system $16_i$, and the roller wheels $50_2$-$50_3$ are located between the front idler wheel $50_1$ and the rear idler wheel $50_4$ in the longitudinal direction of the track system $16_i$, such that the bottom run 66 of the track 41 comprises a front segment 105 under the front idler wheel $50_i$, a rear segment 109 under the rear idler wheel $50_4$, and an intermediate segment 107 under the roller wheels $50_2$-$50_3$ and extending lower than a given one of the front segment 105 and the rear segment 109 of the bottom run 66 of the track 44. In this example, the intermediate segment 107 of the bottom run 66 of the track 41 extends lower than each of the front segment 105 and the rear segment 109 of the bottom run 66 of the track 44. Also, in this example, the intermediate segment 107 of the bottom run 66 of the track 41 is generally flat and parallel to the ground between the roller wheels $50_2$-$50_3$.

As the front and rear idler wheels $50_1$ and $50_4$ maintain the track 41 in tension and may, at least at rest, not apply the track to the ground, the front and rear idler wheels $50_1$ and $50_4$ may be elevated relative to the ground. For example, in this embodiment, a bottom 101 of the front idler wheel $50_1$ is higher than a bottom 102 of a frontmost one of the roller wheels $50_2$-$50_3$ and bottom 104 of a rearmost one of the roller wheels $50_2$-$50_3$. Also, in this embodiment, the bottom 101 of the front idler wheel $50_1$ is higher than a bottom 104 of the rear idler wheels $50_4$. Thus, in this example, a height relative to the ground $H_f$ of the front idler wheel $50_1$ may be greater than a height relative to the ground $H_r$ of the rear idler wheel $50_4$. To manage the traction and the maneuverability of each of the track systems $16_1$-$16_4$, as the front ones of the track systems $16_1$-$16_4$ may require a different amount of traction and/or a different degree of maneuverability than the rear ones of the track systems $16_1$-$16_4$, their respective geometry may differ.

In this embodiment, a distance between the axis of rotation 49 of the drive wheel 42 and an axis of rotation $60_1$ of the front idler wheel $50_1$ in the longitudinal direction of the track system $16_i$ is different from a distance between the axis of rotation 49 of the drive wheel 42 and an axis of rotation $60_4$ of the rear idler wheel $50_4$ in the longitudinal direction of the track system $16_i$. In this example, the roller wheels $50_2$-$50_3$ of the front ones of the track systems $16_1$-$16_4$ may be closer one to another than the roller wheels $50_2$-$50_3$ of the rear ones of the track systems $16_1$-$16_4$. Also, in this example, for the front ones of the track systems $16_1$-$16_4$, the roller wheels $50_2$-$50_3$ may be located closer the rear idler wheel $50_4$ than to the front idler wheel $50_1$, while for the rear ones of the track systems $16_1$-$16_4$, the roller wheels $50_2$-$50_3$ may be closer to the front idler wheel $50_1$ than to the rear idler wheel $50_4$.

The frame 44 supports components of the track system $16_i$, including the idler wheels $50_1$-$50_4$. More particularly, in this embodiment, the front and rear idler wheels $50_1$, $50_4$ are respectively mounted to the frame 44 in a front longitudinal end region of the frame 44 proximate the front longitudinal end 57 of the track system $16_i$ and in a rear longitudinal end region of the frame 44 proximate the rear longitudinal end 59 of the track system $16_i$. The roller wheels $50_2$, $50_3$ are mounted to the frame 44 in a central region of the frame 44 between the front idler wheel $50_1$ and the rear idler wheel $50_4$. Each of the roller wheels $50_2$, $50_3$ may be rotatably mounted directly to the frame 44 or may be rotatably mounted to a link which is pivotally mounted to the frame 44 to which is rotatably mounted an adjacent one of the roller wheels $50_2$, $50_2$, thus forming a "tandem".

In this embodiment, the frame 44 comprises a longitudinal base 90 that is elongated in the longitudinal direction of the track system $16_i$ and carries the idler wheels $50_1$-$50_4$ and an upper part 64 that extends upwardly from the longitudinal base 90. In this example, the upper part 64 of the frame 44 comprises arms $43_1$, $43_2$ that converge upwardly from the longitudinal base 90.

The frame 44 is supported at a support area. More specifically, in this case, the frame 44 is supported by the axle 21 of the ATV 10 to which is coupled the drive wheel 42, such that the support area is intersected by the axis of rotation 49 of the drive wheel 42.

In this embodiment, the frame 44 is pivotable about a pivot axis to facilitate motion of the track system $16_i$ on uneven terrain and enhance its traction on the ground. More particularly, in this embodiment, the pivot axis corresponds to the axis of rotation 49 of the drive wheel 42 and the frame 44 can pivot about the axle of the ATV 10 to which the drive wheel 42 is coupled. In other embodiments, the pivot axis of the frame 44 may be located elsewhere (e.g., lower) than the axis of rotation 49 of the drive wheel 42. In yet other embodiments, the frame 44 may not be pivotable.

Also, in this embodiment, the track system $16_i$ comprises an anti-rotation connector to limit a pivoting movement of the track system $16_i$ relative to the frame 11 of the ATV 10. In this example, the anti-rotation connector comprises a spring and a damper and is connected between the frame 44 of the track system $16_i$ and the frame 11 of the ATV 10 (e.g., via one or more mounting brackets and/or fasteners).

Figure 21A:
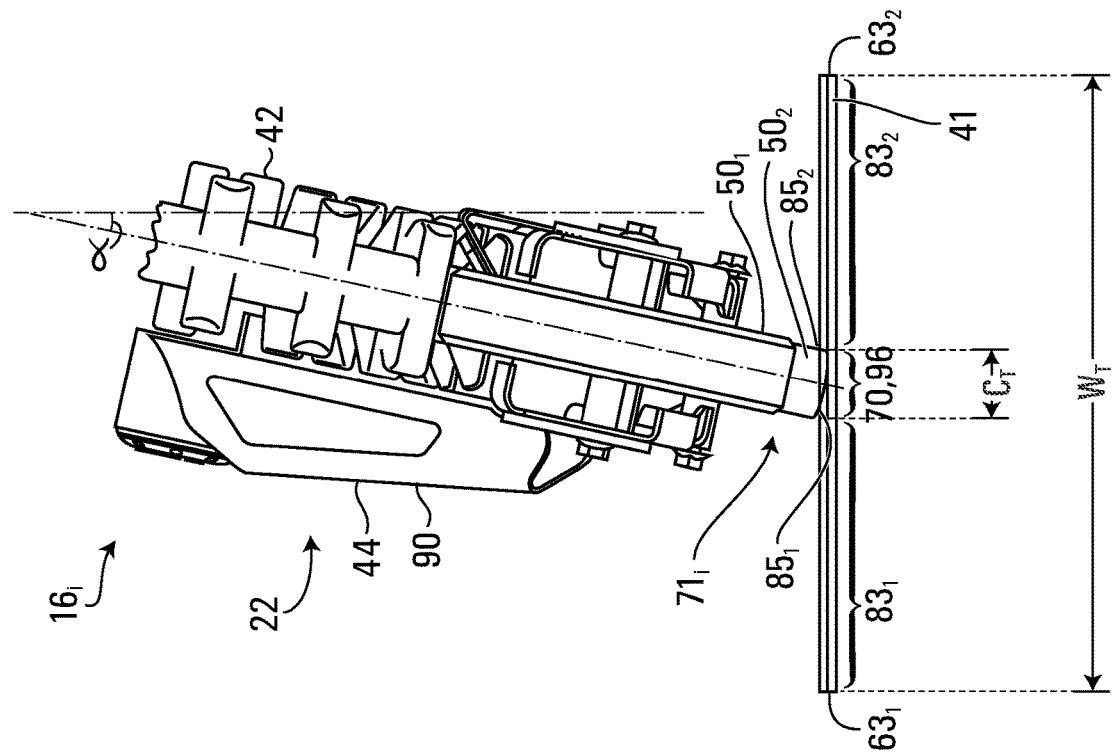
FIGS. 21A and 21B show end views of the track system without its track, without camber and with camber.
Figure 21B:
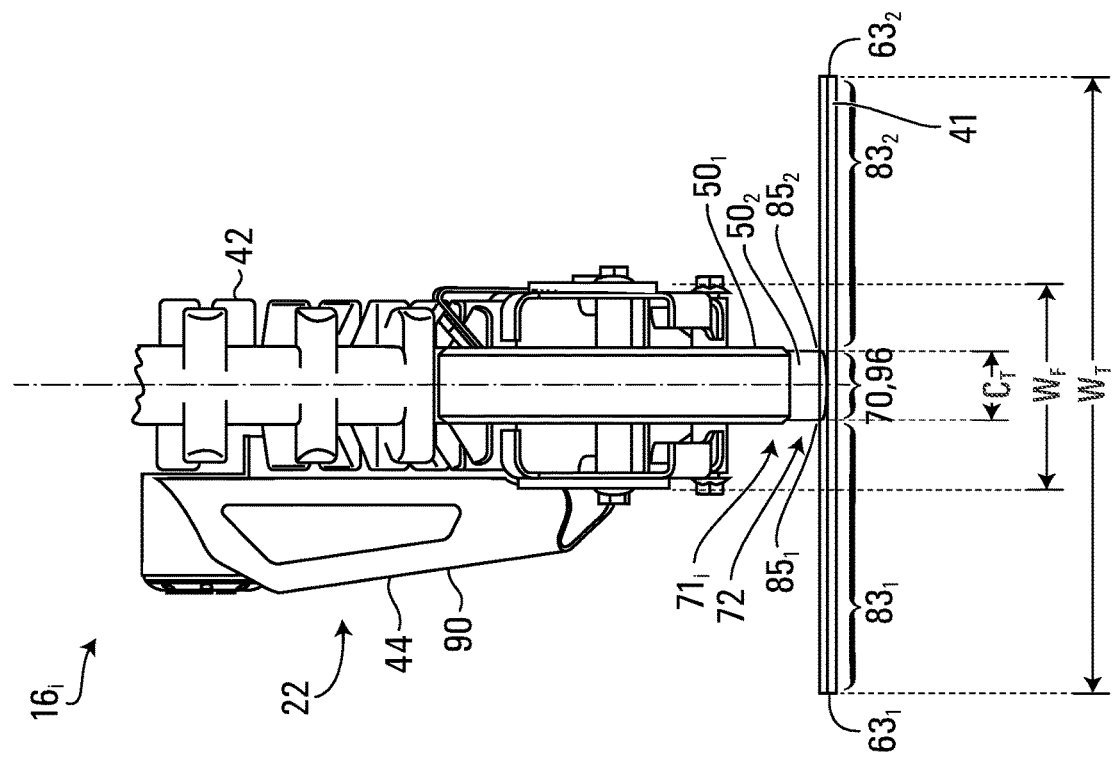

With additional reference to FIGS. 21A and 21B, in this embodiment, the track-engaging assembly 22 is configured to engage the bottom run 66 of the track 41 narrowly at certain locations as this may help to enhance performance of the track system $16_i$. For example, this may help to maintain the contact patch 58 of the track 41 with the ground, even if the track system $16_i$ is cambered (e.g., a ground-engaging wheel $15_i$ replaced by the track system $16_i$ had a camber, i.e., a positive or negative camber, that is inherited by the track system $16_i$). This may also help for shock absorption when the track 41 encounters an obstacle on the ground (e.g., a rock, debris, an abrupt change in ground level, etc.).

An area of contact 70 between the track-engaging assembly 22 and the bottom run 66 of the track 41 is thus narrow in the widthwise direction of the track system $16_i$ at one or more cross-sections of the track-engaging assembly 22 where the track-engaging assembly 22 contacts the bottom run 66 of the track 41. These one or more cross-sections of the track-engaging assembly 22 where it contacts the bottom run 66 of the track 41 are normal to the longitudinal direction of the track system $16_i$ and will be referred to as one or more "track-contacting" cross-sections of the track-engaging assembly 22. The area of contact 70 between the track-engaging assembly 22 and the bottom run 66 of the track 41 encompasses every part of the track-engaging assembly 22 that contacts the bottom run 66 of the track 41. In this example, the area of contact 70 between the track-engaging assembly 22 and the bottom run 66 of the track 41 thus encompasses an area of contact between each of the idler wheels $50_1$-$50_4$ and the bottom run 66 of the track 41.

In this embodiment, the area of contact 70 between the track-engaging assembly 22 and the bottom run 66 of the track 41 is narrow in the widthwise direction of the track system $16_i$ at track-contacting cross-sections $71_1$-$71_4$ of the track-engaging assembly 22 where the idler wheels $50_1$-$50_4$ contact the bottom run 66 of the track 41. In this example, the area of contact 70 between the track-engaging assembly 22 and the bottom run 66 of the track 41 is narrow in the widthwise direction of the track system $16_i$ at every track-contacting cross-section (i.e., at all track-contacting cross-sections) of the track-engaging assembly 22.

More particularly, in this embodiment, at every track-contacting cross-section, including each of the track-contacting cross-sections $71_1$-$71_4$, of the track-engaging assembly 22, the area of contact 70 between the track-engaging assembly 22 and the bottom run 66 of the track 41 spans less than half, in some cases no more than 40%, in some cases no more than 30%, and in some cases no more than 20% of the width $W_T$ of the track 41 in the widthwise direction of the track system $16_i$. That is, a dimension $C_T$ of the area of contact 70 between the track-engaging assembly 22 and the bottom run 66 of the track 41 in the widthwise direction of the track system $16_i$ at every track-contacting cross-section of the track-engaging assembly 22 is less than half, in some cases no more than 40%, in some cases no more than 30%, and in some cases no more than 20% of the width $W_T$ of the track 41.

Also, in this embodiment, at every track-contacting cross-section, including each of the track-contacting cross-sections $71_1$-$71_4$, of the track-engaging assembly 22, the area of contact 70 between the track-engaging assembly 22 and the bottom run 66 of the track 41 is contained within (i.e., is not located beyond) the longitudinal base 90 of the frame 44 of the track system $16_i$ in the widthwise direction of the track system $16_i$. More particularly, in this embodiment, the area of contact 70 between the track-engaging assembly 22 and the bottom run 66 of the track 41 spans no more than a width $W_F$ of the longitudinal base 90 of the frame 44 of the track system $16_i$ in the widthwise direction of the track system $16_i$. In this example, the area of contact 70 between the track-engaging assembly 22 and the bottom run 66 of the track 41 spans less than the width $W_F$ of the longitudinal base 90 of the frame 44 of the track system $16_i$ in the widthwise direction of the track system $16_i$. For instance, in some embodiments, the area of contact 70 between the track-engaging assembly 22 and the bottom run 66 of the track 41 may span less than three-quarters, in some cases less than two-thirds, and in some cases less than half of the width $W_F$ of the longitudinal base 90 of the frame 44 of the track system $16_i$ in the widthwise direction of the track system $16_i$.

Furthermore, in this embodiment, at every track-contacting cross-section, including each of the track-contacting cross-sections $71_1$-$71_4$, of the track-engaging assembly 22, the area of contact 70 between the track-engaging assembly 22 and the bottom run 66 of the track 41 is continuous (i.e., uninterrupted) in the widthwise direction of the track system $16_i$. That is, at track-contacting every cross-section of the track-engaging assembly 22, the area of contact 70 between the track-engaging assembly 22 and the bottom run 66 of the track 41 is defined by a single part of the track-engaging assembly 22 that continuously extends in contact with the bottom run 66 of the track 41 without interruption in the widthwise direction of the track system $16_i$.

Thus, in this embodiment, at every track-contacting cross-section, including each of the track-contacting cross-sections $71_1$-$71_4$, of the track-engaging assembly 22, the track-engaging assembly 22 comprises a track-engaging member 72 engaging the bottom run 66 of the track 41 and is free of contact with (i.e., does not contact) the bottom run 66 of the track 41 from the track-engaging member 72 to the lateral edges $63_1$, $63_2$ of the track 41. For instance, in this embodiment, the track-engaging member 72 is a given one of the idler wheels $50_1$-$50_4$. The track-engaging assembly 22 is free of (i.e., has no) track-engaging structure spaced from the given one of the idler wheels $50_1$-$50_4$ in the widthwise direction of the track system $16_i$ and contacting the bottom run 66 of the track 41.

More particularly, in this embodiment, the idler wheels $50_1$-$50_4$ are centrally disposed in the widthwise direction of the track system $16_i$. Each of the idler wheels $50_1$-$50_4$ overlaps a centerline 75 of the track 41 that bisects the track's width $W_T$. The idler wheels $50_1$-$50_4$ are arranged in a single line following the centerline 75 of the track 1 in the longitudinal direction of the track system $16_i$. Also, the idler wheels $50_1$-$50_4$ are aligned with the drive wheel 42 in the widthwise direction of the track system $16_i$.

In this embodiment, the idler wheels $50_1$-$50_4$ are contained within the longitudinal base 90 of the frame 44 of the track-engaging assembly 22 in the widthwise direction of the track system $16_i$. More particularly, in this embodiment, the longitudinal base 90 of the frame 44 comprises voids $93_1$-$93_v$ for containing respective ones of the idler wheels $50_1$-$50_4$. In some examples, each of the voids $93_1$-$93_4$ may contain only a single one of the idler wheels $50_1$-$50_4$. In other examples, a given one of the voids $93_1$-$93_v$ may contain at least two of the idler wheels $50_1$-$50_4$. The voids $93_1$-$93_v$ are aligned with the drive wheel 42 in the widthwise direction of the track system $16_i$. In other embodiments, the longitudinal base 90 of the frame 44 of the track system $16_i$ may comprise only a single void containing all of the idler wheels $50_1$-$50_4$. In some cases, this may allow the track system $16_i$ to be reduced in width, thus allowing a lower width to the vehicle 10.

As shown in FIGS. 21A and 21B, in this embodiment, the track-engaging assembly 22 is configured such that every part of the track-engaging assembly 22 that contacts the bottom run 66 of the track 41 remains in contact with the bottom run 66 of the track 41 even if the track system $16_i$ is cambered. More particularly, in this embodiment, the track-engaging assembly 22 is configured such that every one of the idler wheels $50_1$-$50_4$ remains in contact with the bottom run 66 of the track 41, even if the track system $16_i$ is cambered. This may help to maintain the contact patch 58 of the track 41 with the ground and thus enhance traction. For example, in this embodiment, the track system $16_i$ is cambered because a ground-engaging wheel $15_i$ replaced by the track system $16_i$ had a camber, i.e., a positive or negative camber, so that, when the track system $16_i$ is mounted in place of the ground-engaging wheel $15_i$, the camber is inherited by the track system $16_i$.

For instance, in some embodiments, every one of the idler wheels $50_1$-$50_4$ may remain in contact with the bottom run 66 of the track 41 even if the track system $16_i$ is cambered at a camber angle α of at least 5°, in some cases at least 10°, in some cases at least 15°, in some cases at least 20°, and in some cases even more.

Figure 22B:
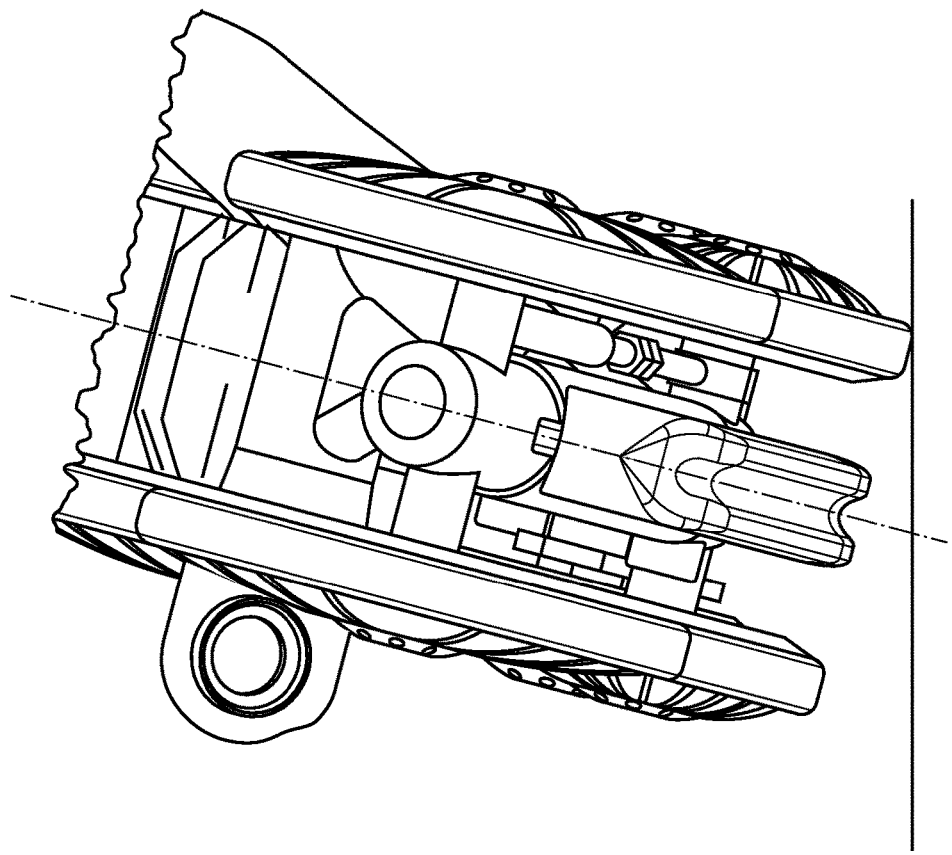
FIGS. 22A and 22B show end views of a conventional track system without its track, without camber and with camber.
Figure 22A:
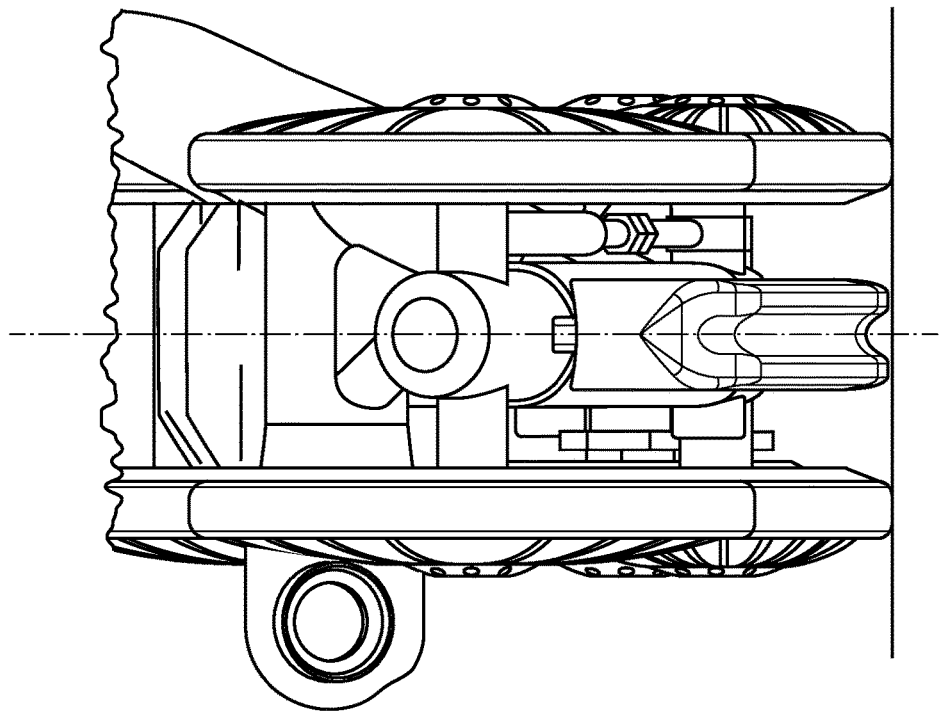

This contrasts with a conventional track system with a wide area of contact between its track-engaging assembly and a bottom run of its track, an example of which is shown in FIGS. 22A and 22B, where some of its idler wheels and/or other parts of its track-engaging assembly would not contact the bottom run of its track when the conventional track system is cambered.

The area of contact 70 between the track-engaging assembly 22 and the bottom run 66 of the track 41 being narrow in the widthwise direction of the track system $16_i$ may also be useful for steerability and/or other aspects of maneuverability. For example, in some embodiments, this may be useful when the track system $16_i$ is steered about the steering axis 29. For instance, in some cases, a stabilization of the vehicle 10 may be improved such as by having the areas of contact 70 for each of the track systems $16_1$-$16_4$ that are more distant in the widthwise direction of the vehicle 10 relative to a longitudinal centerline 81 of the vehicle 10. Additionally or alternatively, in some cases, mechanical stresses in parts of the track system $16_i$ and/or the vehicle 10, such as the suspension 19, may be diminished.

Figure 24:
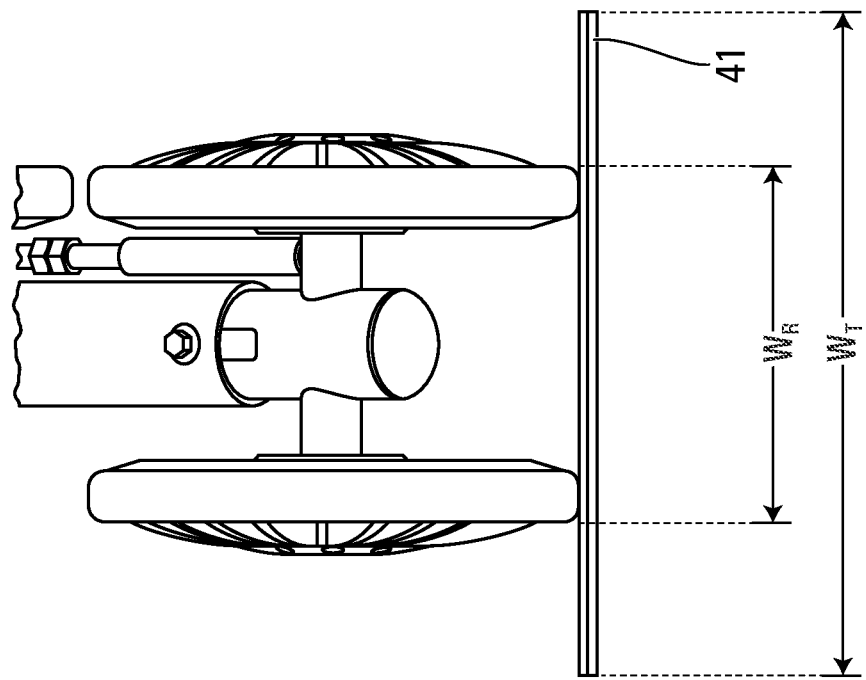
FIG. 24 shows a leading idler wheel and a segment of the track of the track system.
Figure 23:
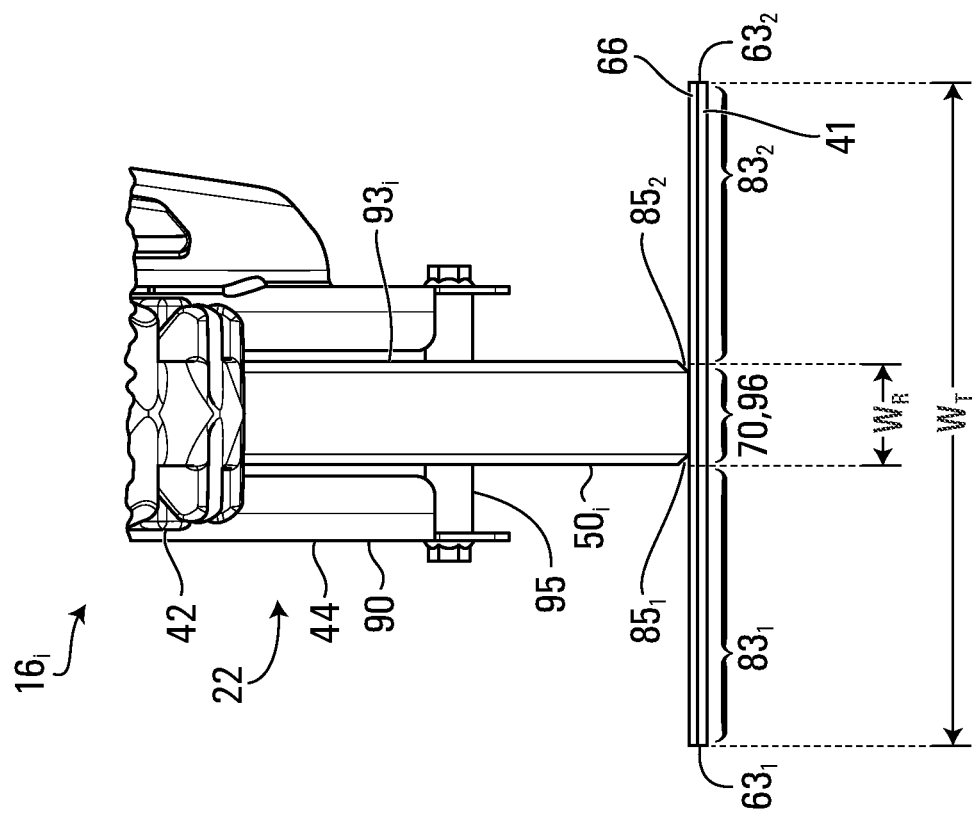
FIG. 23 shows a leading idler wheel and a segment of a track of a conventional track system.
Figure 26:
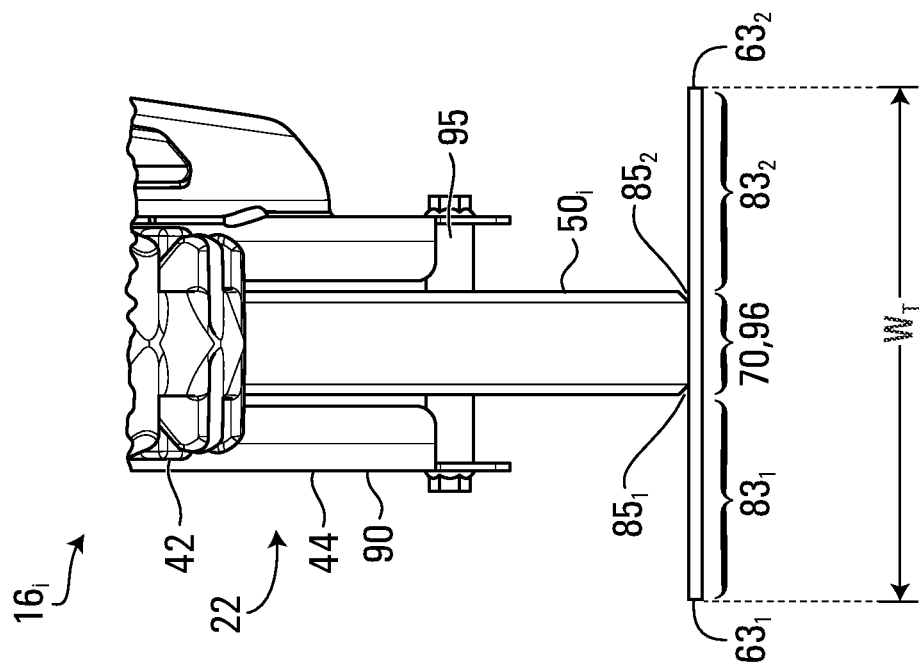
FIGS. 25 and 26 show the leading idler wheel and the segment of the track of the track system with and without presence of an obstacle.

In this embodiment, with additional reference to FIGS. 23, 24 and 26, the area of contact 70 between the track-engaging assembly 22 and the bottom run 66 of the track 41 being narrow in the widthwise direction of the track system $16_i$ may help for shock absorption when the track 41 encounters an obstacle 80 on the ground (e.g., a rock, debris, an abrupt change in ground level, etc.).

More particularly, in this embodiment, this reduces a potential for the track-engaging assembly 22 to impact the obstacle 80 on the ground when the track system $16_i$ encounters the obstacle 80 on the ground, and allows a given one of lateral portions $83_1$, $83_2$ of the track 41 that extend from lateral extremities of the area of contact 70 of $85_1$, $85_2$ between the track-engaging assembly 22 and the bottom run 66 of the track 41 to the lateral edges $63_1$, $63_2$ of the track 41 to flex inwardly and absorb a shock from encountering the obstacle 80 on the ground.

Figure 25:
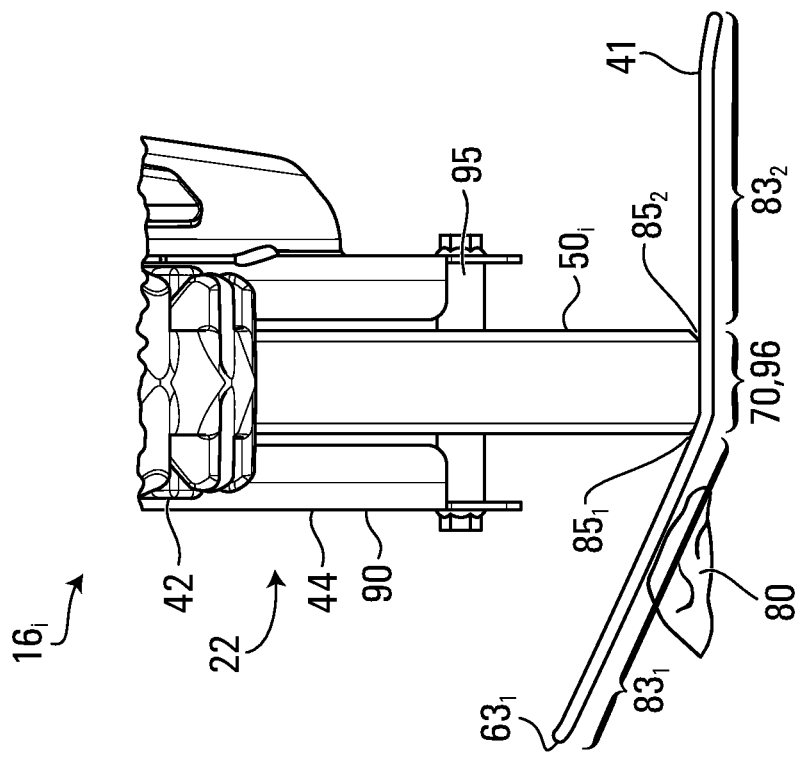
Figure 27:
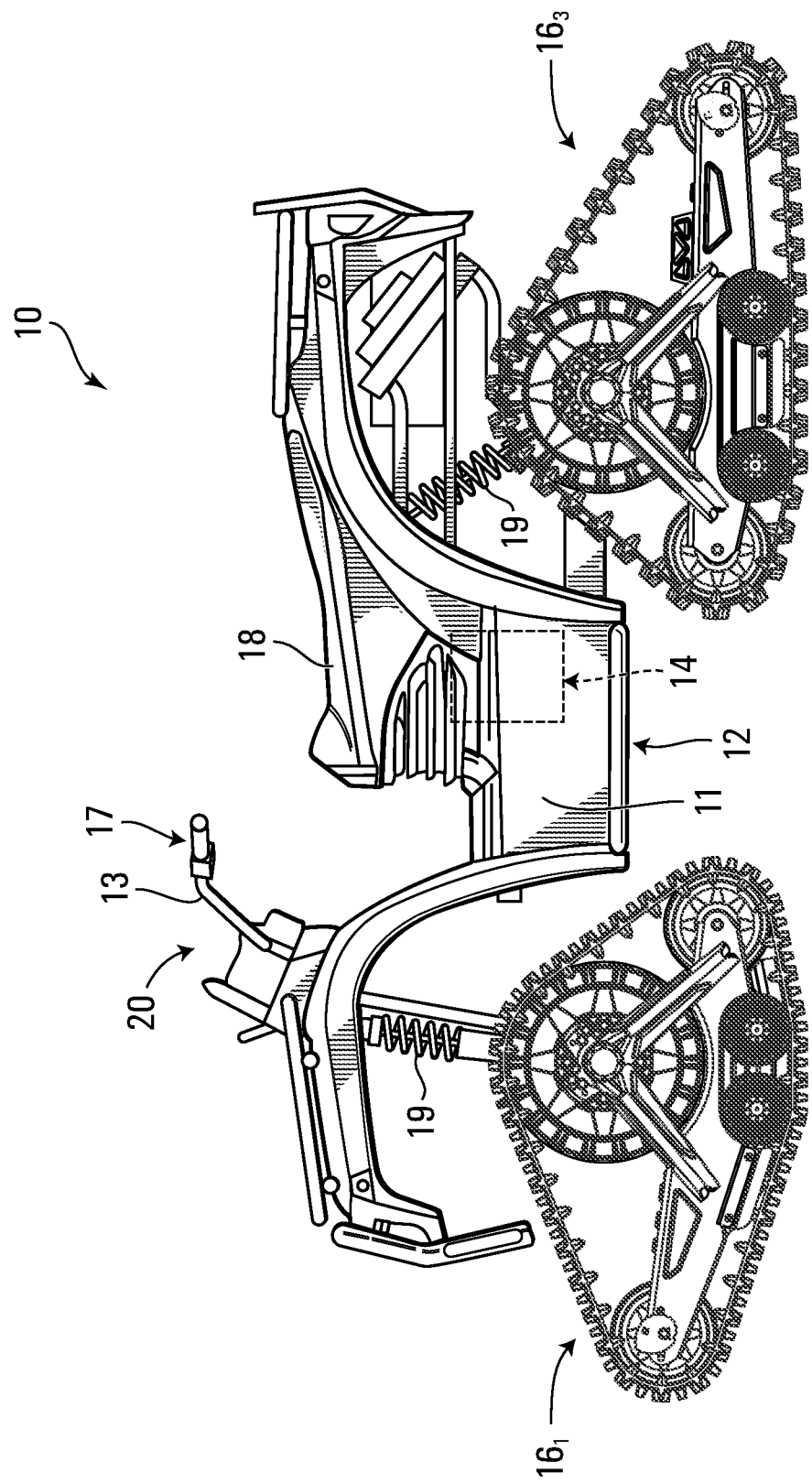
FIG. 27 shows an example of another embodiment of the track system.
Figure 28:
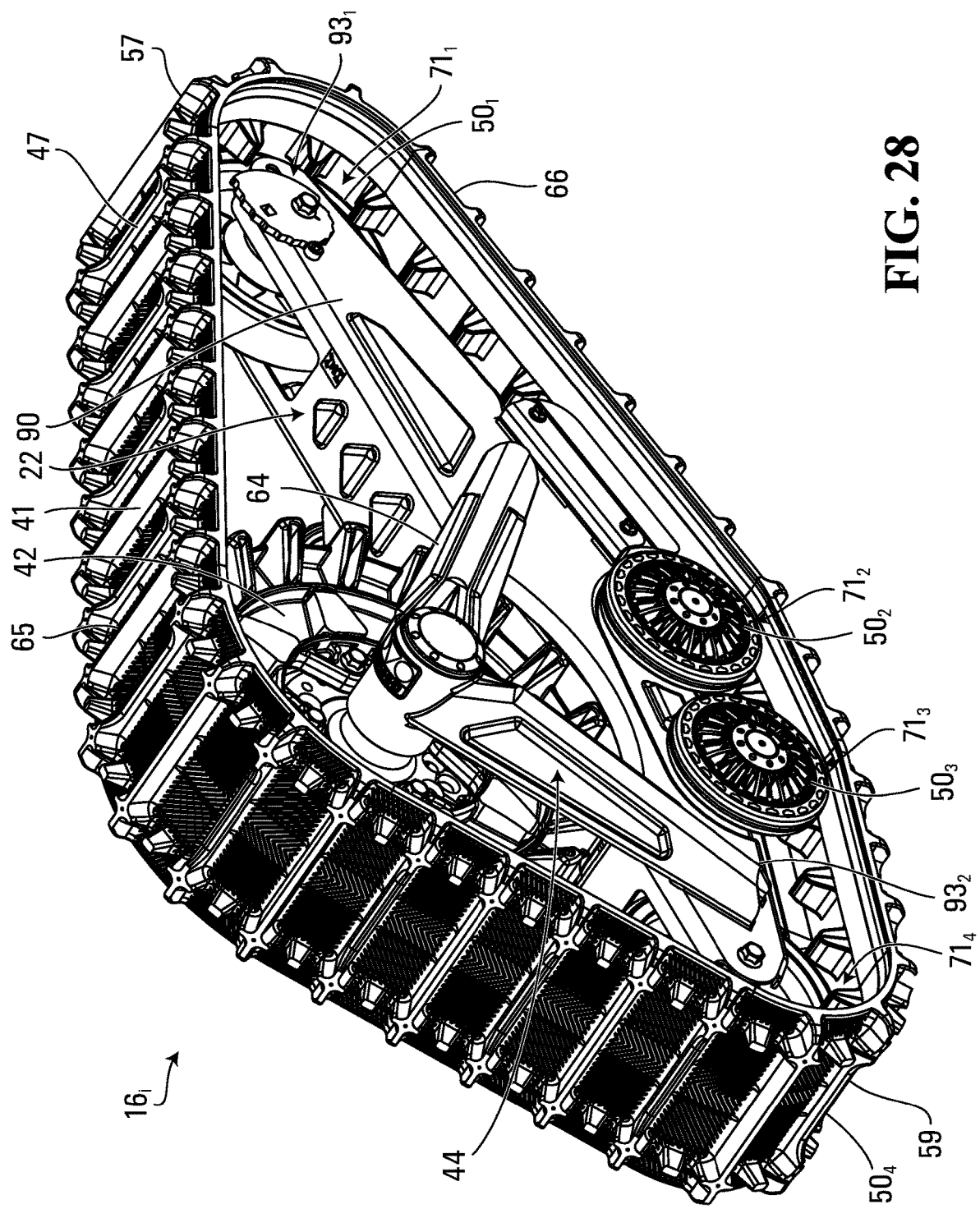
FIGS. 28 and 29 show views of the track system of FIG. 27.
Figure 29:
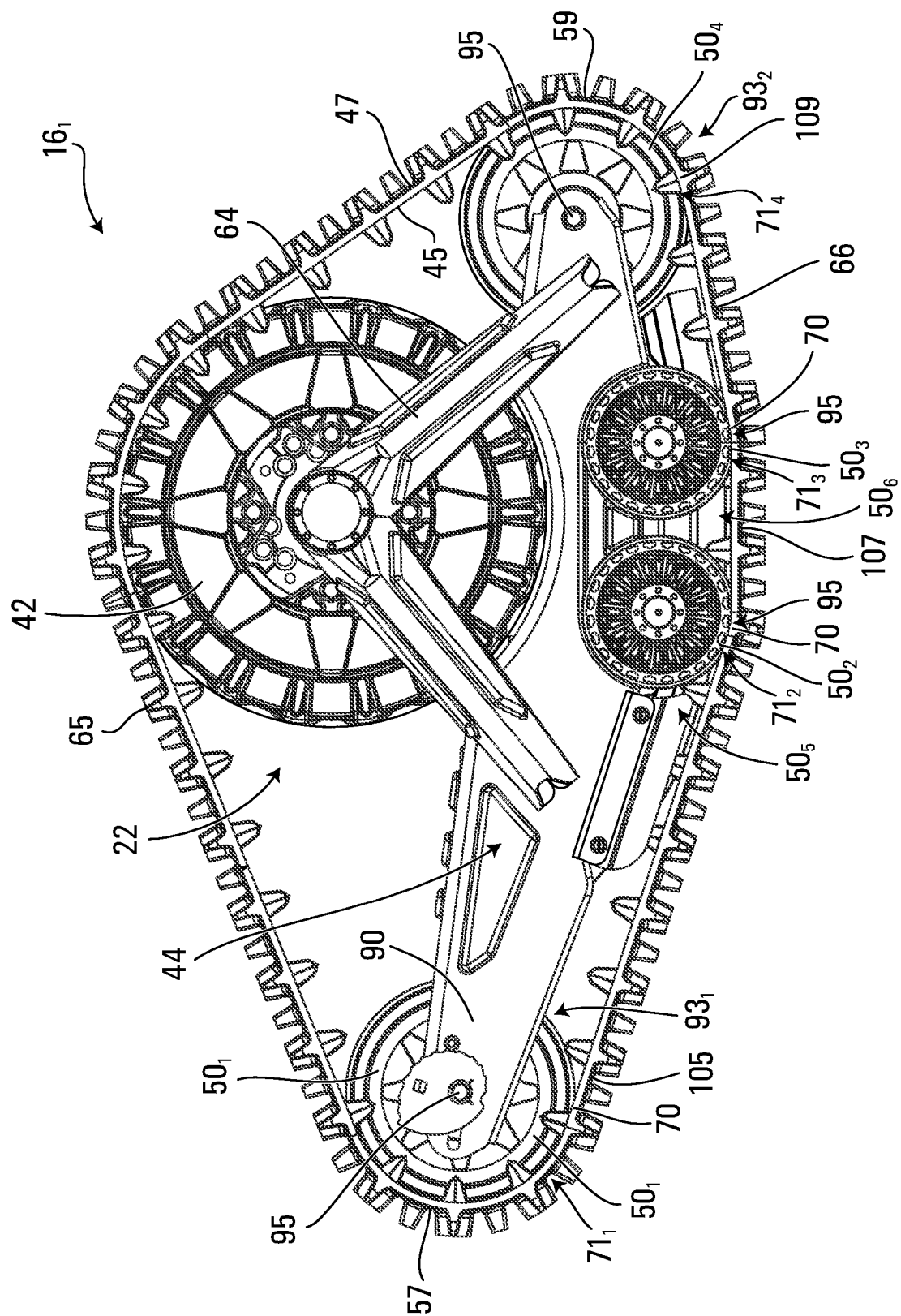
Figure 30:
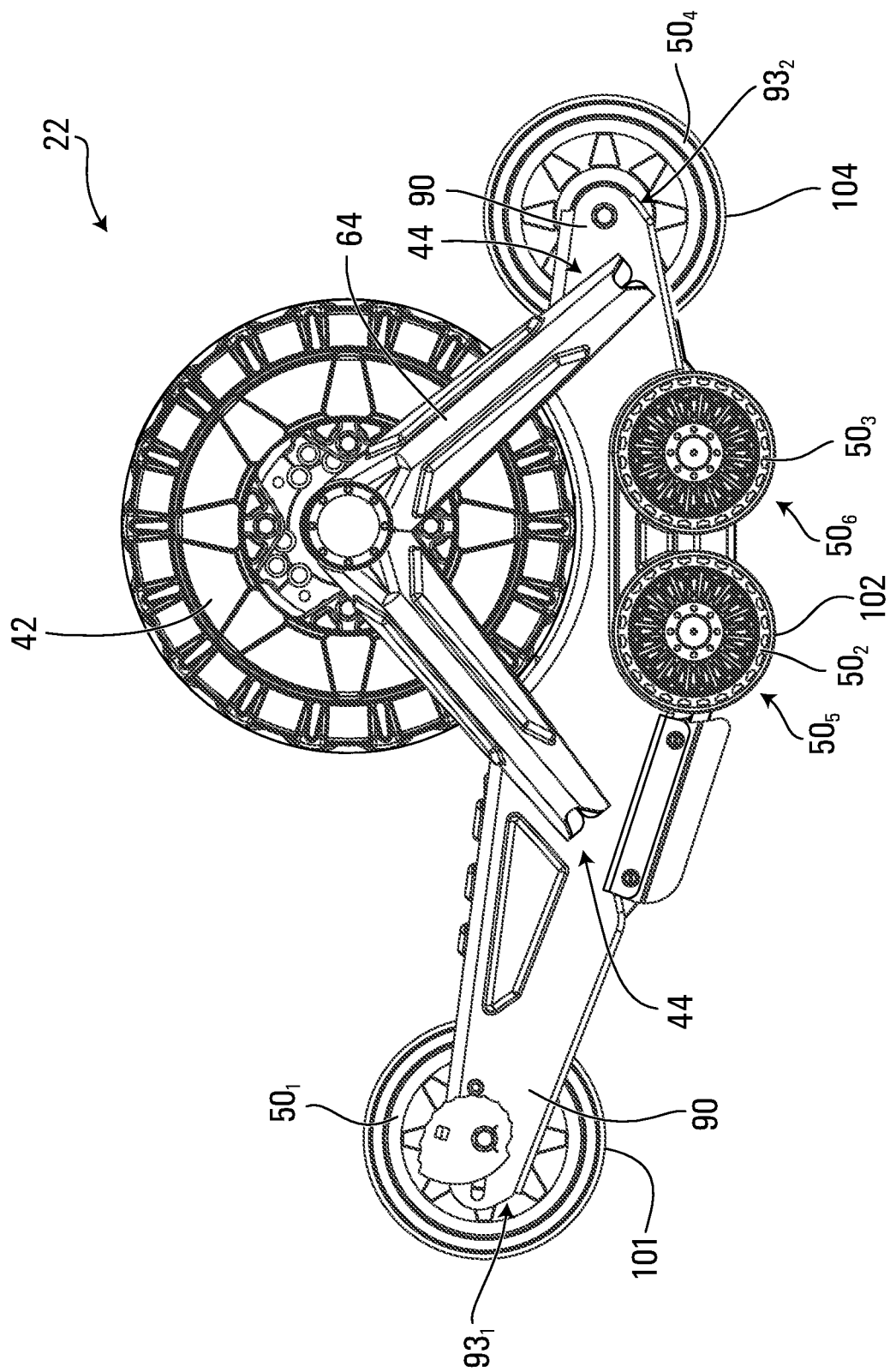
FIG. 30 shows a view of the track system of FIG. 27 without its track.

For instance, the track system $16_i$ comprises a stiffer (i.e., more rigid) ground-engaging portion 96 having a width $W_R$ where the track system $16_i$ is more exposed to stress occasioned by the obstacle 80 on the ground. The width $W_R$ of the stiffer ground-engaging portion 96 of the track system $16_i$ may be less than that of a conventional track system comprising rows of idler wheels that are laterally spaced apart, an example of which is shown in FIG. 25, such that a narrower extent of the stiffer ground-engaging portion 96 of the track system $16_i$ diminishes a risk that the obstacle 80 is encountered at the stiffer ground-engaging portion 96 of the track system $16_i$ and rather increases a likelihood that the obstacle 80 is encountered at either one of lateral portions $83_1$, $83_2$ of the track 41, which may help for shock absorption by deformation of that impacted one of the lateral portions $83_1$, $83_2$ of the track 41 which is substantially free to bend or otherwise deform as it is uncontacted by the track-engaging assembly 22.

The track system $16_i$ may be implemented in various other ways in other embodiments.

For example, with additional reference to FIGS. 27 to 30, in some embodiments, the area of contact 70 between the track-engaging assembly 22 and the bottom run 66 of the track 41 may be narrow in the widthwise direction of the track system $16_i$ at some but not all track-contacting cross-sections of the track-engaging assembly 22, such as at one or more of but not all of the track-contacting cross-sections $71_1$-$71_4$ of the track-engaging assembly 22 where the idler wheels $50_1$-$50_4$ contact the bottom run 66 of the track 41.

In this embodiment, the track-engaging assembly 22 comprises roller wheels $50_2$, $50_3$, $50_5$, $50_6$ and the area of contact 70 between the track-engaging assembly 22 and the bottom run 66 of the track 41 at each of the track-contacting cross-sections $71_1$, $71_4$ of the track-engaging assembly 22 where a respective one of the front and rear idler wheels $50_1$, $50_4$ contacts the bottom run 66 of the track 41 is narrow as discussed above in respect of FIGS. 21A and 21B, whereas the area of contact 70 between the track-engaging assembly 22 and the bottom run 66 of the track 41 at each of the track-contacting cross-sections $71_2$, $71_3$ of the track-engaging assembly 22 where respective ones of the roller wheels $50_2$, $50_3$, $50_5$, $50_6$ contacts the bottom run 66 of the track 41 is wider.

Figure 33:
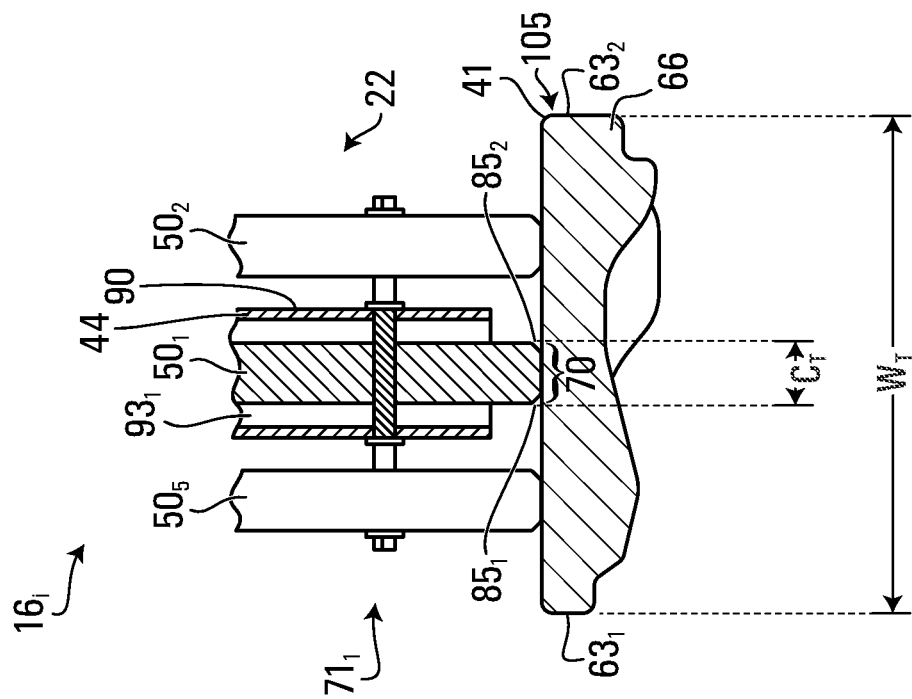
FIGS. 32 and 33 show a cross-sectional view of the leading idler wheel in contact with the track and of roller wheels in contact with the track according to a various embodiment of the track system.
Figure 32:
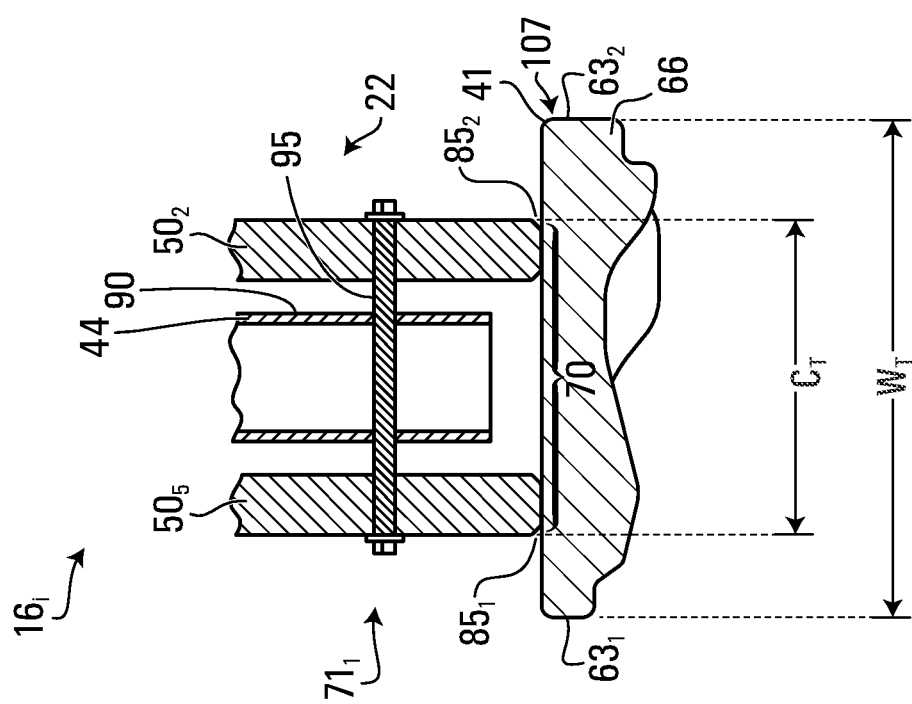

As best seen in FIGS. 32 and 33, in this embodiment, a ratio of (1) the dimension $C_T$ of the area of contact 70 between the track-engaging assembly 22 and the bottom run 66 of the track 41 in the widthwise direction of the track system $16_i$ at each of the track-contacting cross-sections $71_1$, $71_4$ of the track-engaging assembly 22 where a respective one of the front and rear idler wheels $50_1$, $50_4$ contacts the bottom run 66 of the track 41 over (2) the dimension $C_T$ of the area of contact 70 between the track-engaging assembly 22 and the bottom run 66 of the track 41 at each of the track-contacting cross-sections $71_2$, $71_3$ of the track-engaging assembly 22 where respective ones of the roller wheels $50_2$, $50_3$, $50_5$, $50_6$ contacts the bottom run 66 of the track 41 is no more than 0.9, in some cases no more than 0.8, in some cases no more than 0.7, and in some cases even less.

In this embodiment, the longitudinal base 90 of the frame 44 comprises the voids $93_1$, $93_2$ configured to house the leading idler wheel $50_1$ and the trailing idler wheel $50_4$, whereas the roller wheels $50_2$, $50_3$, $50_5$, $50_6$ are not housed in a void of the frame 44, but rather located outside of the longitudinal base 90 of the frame 44 and face outer lateral surfaces $98_1$, $98_2$ of the longitudinal base 90 of the frame 44.

In some examples, an attachment 95 between each of the roller wheels $50_2$, $50_3$, $50_5$, $50_6$ and the longitudinal base 90 of the frame 44 may be rigid such as to prevent each pair of the roller wheels $50_2$, $50_3$, $50_5$, $50_6$ to rotate relative to the frame 44 of the track system $16_i$. In other examples, the attachment 95 between each of the roller wheels $50_2$, $50_3$, $50_5$, $50_6$ and the longitudinal base 90 of the frame may be flexible such as to allow each pair of the roller wheels $50_2$, $50_3$, $50_5$, $50_6$ to rotate relative to the frame 44 of the track system 16, to emulate certain advantages discussed above. In yet other examples, the attachment 95 between each of the roller wheels $50_2$, $50_3$, $50_5$, $50_6$ and the longitudinal base 90 of the frame may be rigid such as to prevent each pair of the roller wheels $50_2$, $50_3$, $50_5$, $50_6$ to rotate relative to the frame 44 of the track system 16, but a material of the roller wheels $50_2$, $50_3$, $50_5$, $50_6$, and/or a geometry of the roller wheels $50_2$, $50_3$, $50_5$, $50_6$ combined with a geometry of the inner side 45 of the track 41 may be such that certain advantages discussed above are replicated.

Figure 31A:
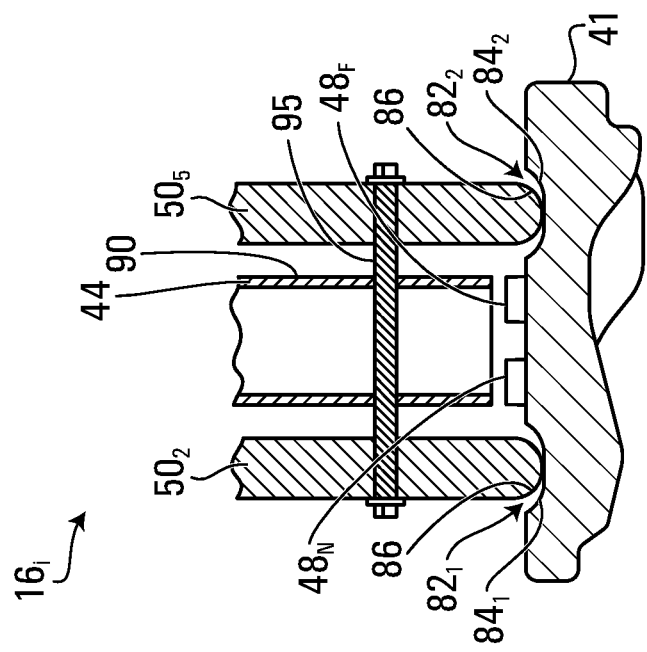
FIGS. 31A and 31C show a cross-sectional view of the leading idler wheel in contact with the track according to a various embodiment of the track system.
Figure 31B:
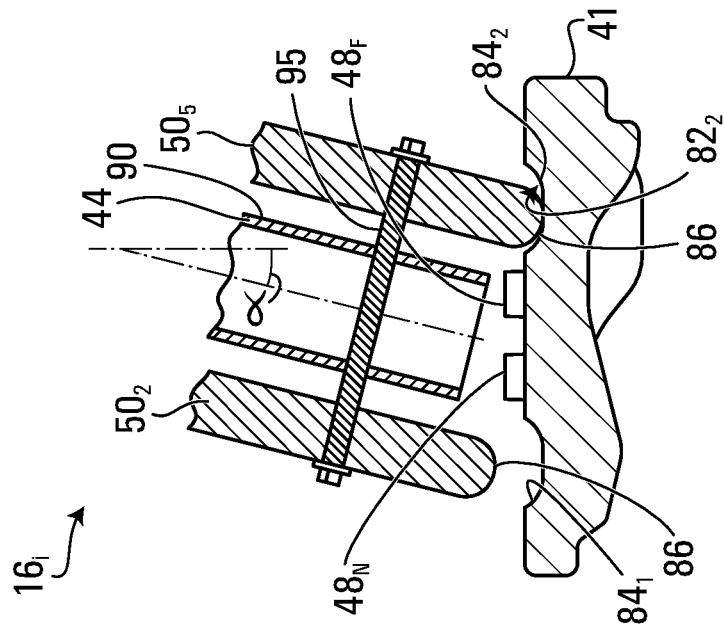
Figure 31C:
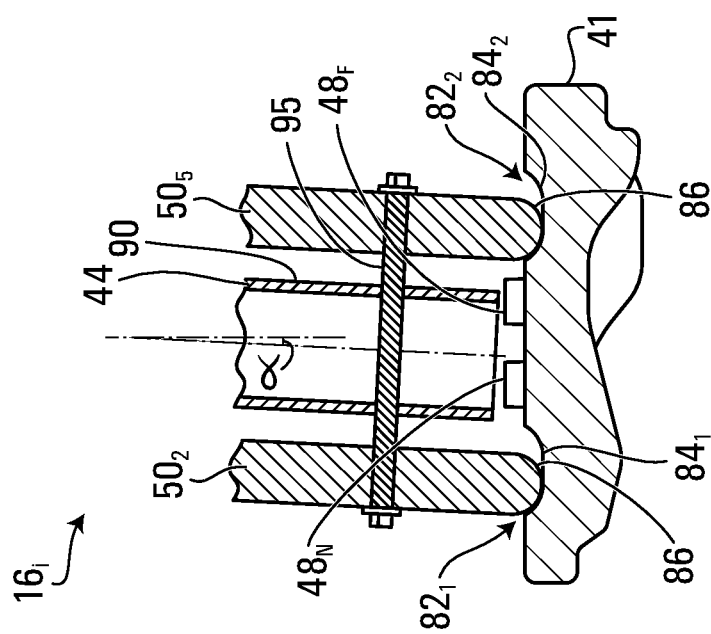

For example, with additional reference to FIGS. 31A to 31B, the inner surface 32 may comprise grooves $82_1, 82_2$ themselves comprising rolling surfaces $84_1$-$84_2$ extending longitudinally along the track 41 and the roller wheels $50_2$, $50_3$, $50_5$, $50_6$ may comprise a rolling surface 86 that is curved is such a way that, when there the track system 16, is cambered, the roller wheels $50_2$, $50_3$, $50_5$, $50_6$ may be in contact with the rolling surfaces $84_1$-$84_2$ when the camber angle α is less than a certain value (e.g., 5°, 10°, 15° or 20°), but at least one of the roller wheels $50_2$, $50_3$, $50_5$, $50_6$ may be not be in contact with the rolling surfaces $84_1$-$84_2$ when the camber angle α is more than that certain value.

While in this embodiment the track system 16, is part of the ATV 10, in other embodiments, a track system constructed according to principles discussed herein may be used as part of other types of tracked vehicles.

Figure 34:
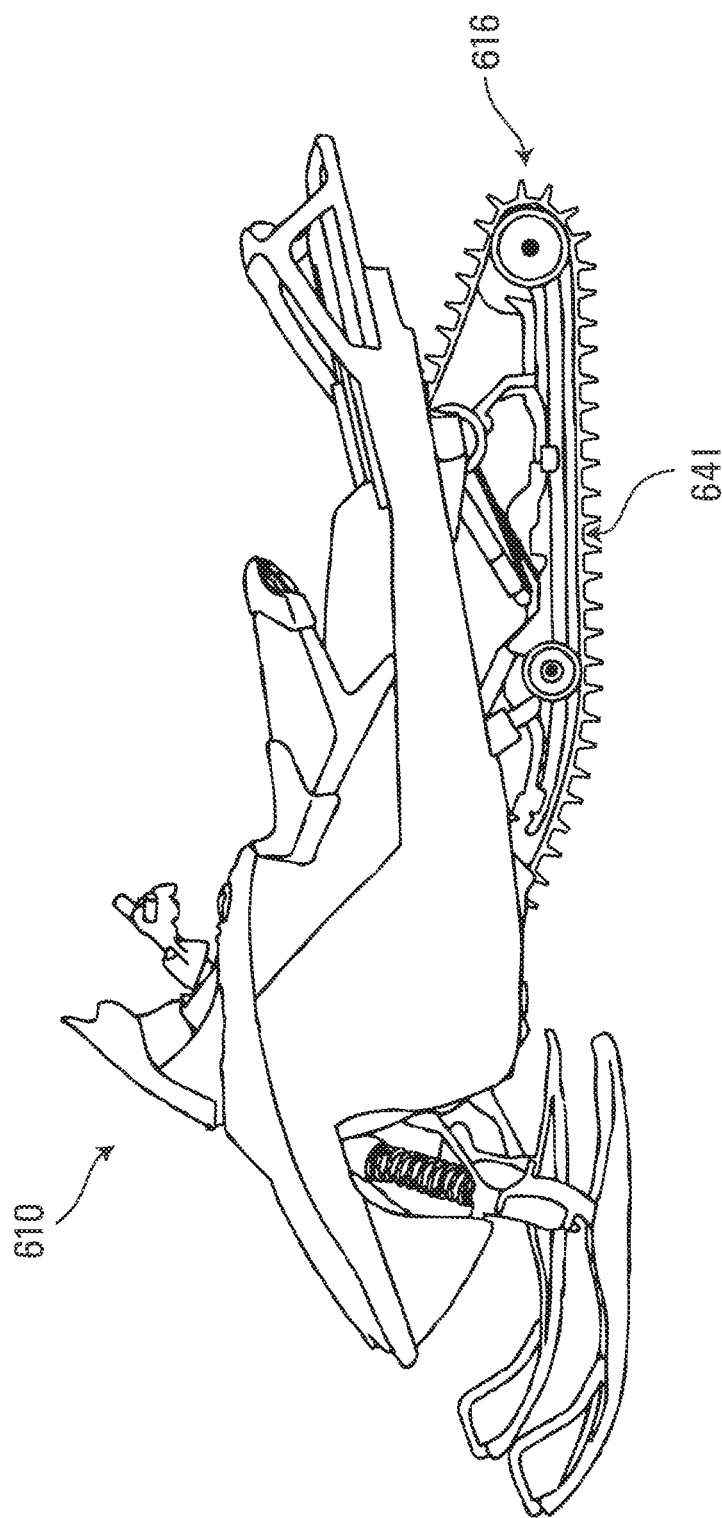
FIG. 34 shows an example of an embodiment of a track system of a snowmobile.

For example, in some embodiments, as shown in FIG. 34, a track system 616 comprising a track 641 constructed according to principles discussed herein may be used as part of a snowmobile 610.

Figure 35:
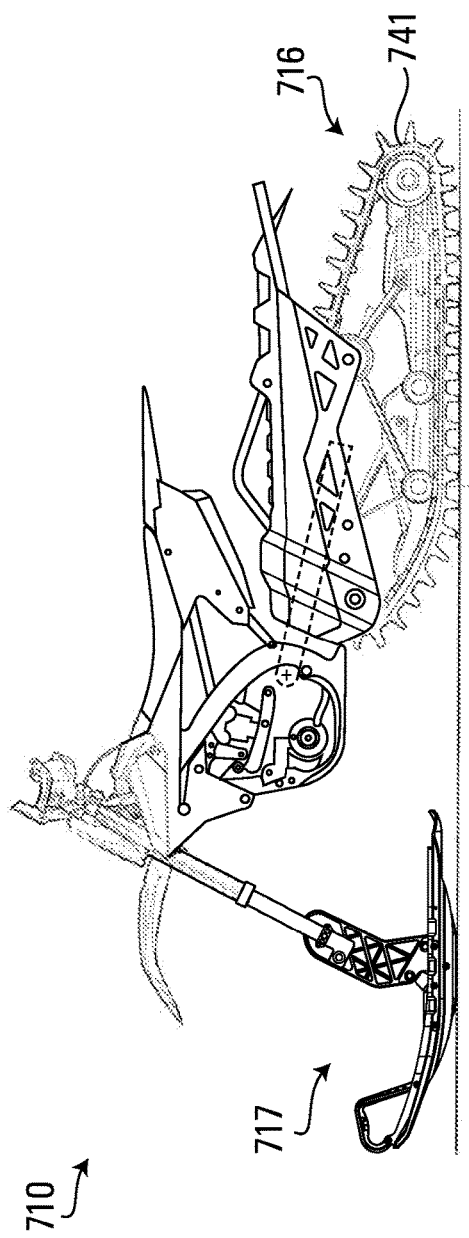
FIG. 35 shows an example of an embodiment of a track system of a snow bike.
Figure 36:
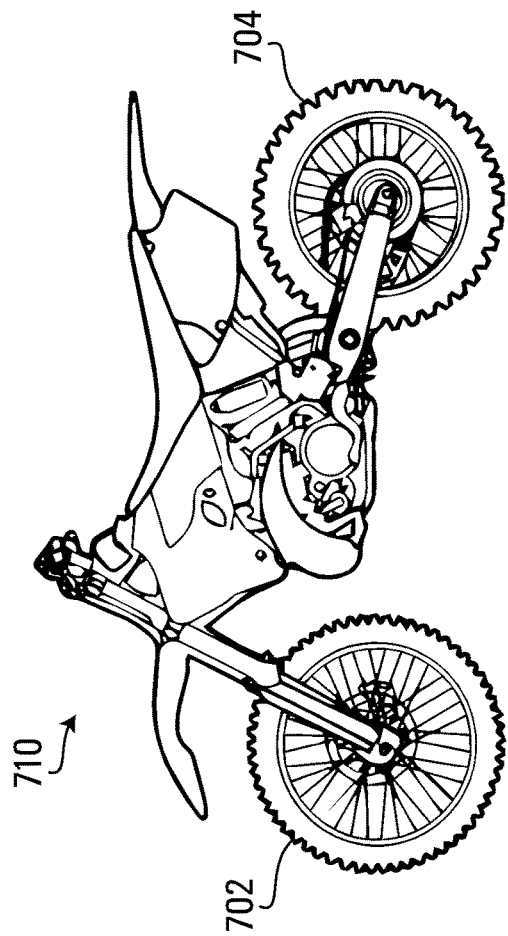
FIG. 36 shows the snow bike of FIG. 35 when it is converted to be equipped with front and rear wheels.

As another example, in some embodiments, as shown in FIGS. 35 and 36, a track system 716 comprising a track 741 constructed according to principles discussed herein may be used as part of a snow bike 710. The snow bike 710 is a motorcycle equipped with a ski system 717 mounted in place of a front wheel 702 of the motorcycle and the track system 716 mounted in place of a rear wheel 704 of the motorcycle. In this example, the track system 716 also replaces a rear suspension unit (e.g., a shock absorber and a swing arm) of the motorcycle. Basically, the track system 716 converts the motorcycle into a tracked vehicle for travelling on snow.

The ATV 10, the snowmobile 610 and the snow bike 710 considered above are examples of recreational vehicles. While they can be used for recreational purposes, such recreational vehicles may also be used for utility purposes in some cases.

Also, while these examples pertain to recreational vehicles, a track system comprising a track constructed according to principles discussed herein may be used as part of tracked vehicles other than recreational ones (e.g., agricultural vehicles, construction vehicles, military vehicles, and other off-road vehicles).

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for purposes of description but is not limiting. Various modifications and enhancements will become apparent to those of ordinary skill in the art.

The invention claimed is:

1. A track system for a vehicle, the track system comprising:
a track comprising a ground-engaging outer surface for engaging the ground, an inner surface opposite to the ground-engaging outer surface, and a plurality of wheel-contacting projections projecting from the inner surface; and
a track-engaging assembly configured to move the track around the track-engaging assembly;
wherein: the track is elastomeric to flex around the track-engaging assembly; each wheel-contacting projection of the track comprises elastomeric material constituting at least most of the wheel-contacting projection; an area of contact between the track-engaging assembly and a bottom run of the track encompasses every part of the track-engaging assembly contacting the bottom run of the track; a span of the area of contact between the track-engaging assembly and the bottom run of the track is a distance from a rightmost point of the area of contact between the track-engaging assembly and the bottom run of the track to a leftmost point of the area of contact between the track-engaging assembly and the bottom run of the track and is less than half of a width of the track in a widthwise direction of the track system at a cross-section of the track-engaging assembly where the track-engaging assembly contacts the bottom run of the track; the track-engaging assembly comprises a drive wheel for driving the track and a plurality of idler wheels contacting the bottom run of the track; and an axis of rotation of the drive wheel is located between an axis of rotation of a leading one of the idler wheels and an axis of rotation of a trailing one of the idler wheels in a longitudinal direction of the track system.

2. The track system of claim 1, wherein the span of the area of contact between the track-engaging assembly and the bottom run of the track is no more than 40% of the width of the track in the widthwise direction of the track system at the cross-section of the track-engaging assembly.

3. The track system of claim 1, wherein the span of the area of contact between the track-engaging assembly and the bottom run of the track is no more than 30% of the width of the track in the widthwise direction of the track system at the cross-section of the track-engaging assembly.

4. The track system of claim 1, wherein the span of the area of contact between the track-engaging assembly and the bottom run of the track is spans no more than 20% of the width of the track in the widthwise direction of the track system at the cross-section of the track-engaging assembly.

5. The track system of claim 1, wherein the span of the area of contact between the track-engaging assembly and the bottom run of the track is less than half of the width of the track in the widthwise direction of the track system at every cross-section of the track-engaging assembly where the track-engaging assembly contacts the bottom run of the track.

6. The track system of claim 1, wherein the span of the area of contact between the track-engaging assembly and the bottom run of the track is no more than 40% of the width of the track in the widthwise direction of the track system at every cross-section of the track-engaging assembly where the track-engaging assembly contacts the bottom run of the track.

7. The track system of claim 1, wherein the span of the area of contact between the track-engaging assembly and the bottom run of the track is no more than 30% of the width of the track in the widthwise direction of the track system at every cross-section of the track-engaging assembly where the track-engaging assembly contacts the bottom run of the track.

8. The track system of claim 1, wherein the span of the area of contact between the track-engaging assembly and the bottom run of the track is no more than 20% of the width of the track in the widthwise direction of the track system at every cross-section of the track-engaging assembly where the track-engaging assembly contacts the bottom run of the track.

9. The track system of claim 1, wherein the span of the area of contact between the track-engaging assembly and the bottom run of the track is less than half of the width of the track in the widthwise direction of the track system at cross-sections of the track-engaging assembly where respective ones of the idler wheels contact the bottom run of the track.

10. The track system of claim 9, wherein the span of the area of contact between the track-engaging assembly and the bottom run of the track is no more than 40% of the width of the track in the widthwise direction of the track system at the cross-sections of the track-engaging assembly where the respective ones of the idler wheels contact the bottom run of the track.

11. The track system of claim 9, wherein the span of the area of contact between the track-engaging assembly and the bottom run of the track is no more than 30% of the width of the track in the widthwise direction of the track system at the cross-sections of the track-engaging assembly where the respective ones of the idler wheels contact the bottom run of the track.

12. The track system of claim 9, wherein the span of the area of contact between the track-engaging assembly and the bottom run of the track is no more than 20% of the width of the track in the widthwise direction of the track system at the cross-sections of the track-engaging assembly where the respective ones of the idler wheels contact the bottom run of the track.

13. The track system of claim 1, wherein: the track-engaging assembly comprises a frame supporting the idler wheels; the frame comprises a longitudinal base carrying the idler wheels; and the area of contact between the track-engaging assembly and the bottom run of the track is contained within the longitudinal base of the frame of the track-engaging assembly in the widthwise direction of the track system.

14. The track system of claim 1, wherein: the track-engaging assembly comprises a frame supporting the idler wheels; the frame comprises a longitudinal base carrying the idler wheels; and the span of the area of contact between the track-engaging assembly and the bottom run of the track is no more than a width of the longitudinal base of the frame of the track-engaging assembly in the widthwise direction of the track system.

15. The track system of claim 14, wherein the span of the area of contact between the track-engaging assembly and the bottom run of the track is less than the width of the longitudinal base of the frame of the track-engaging assembly in the widthwise direction of the track system.

16. The track system of claim 14, wherein the span of the area of contact between the track-engaging assembly and the bottom run of the track is less than three-quarters of the width of the longitudinal base of the frame of the track-engaging assembly in the widthwise direction of the track system.

17. The track system of claim 14, wherein the span of the area of contact between the track-engaging assembly and the bottom run of the track is less than two-thirds of the width of the longitudinal base of the frame of the track-engaging assembly in the widthwise direction of the track system.

18. The track system of claim 14, wherein the span of the area of contact between the track-engaging assembly and the bottom run of the track is less than half of the width of the longitudinal base of the frame of the track-engaging assembly in the widthwise direction of the track system.

19. The track system of claim 1, wherein the area of contact between the track-engaging assembly and the bottom run of the track is continuous in the widthwise direction of the track system.

20. The track system of claim 1, wherein, at the cross-section of the track-engaging assembly, the track-engaging assembly comprises a track-engaging member engaging the bottom run of the track and is free of contact with the bottom run of the track from the track-engaging member to lateral edges of the track.

21. The track system of claim 20, wherein the track-engaging member is a given one of the idler wheels.

22. The track system of claim 1, wherein the idler wheels are centrally disposed in the widthwise direction of the track system such that each of the idler wheels overlaps a centerline of the track that bisects the track in the widthwise direction of the track.

23. The track system of claim 22, wherein the idler wheels are arranged in a single line following the centerline of the track in the longitudinal direction of the track system.

24. The track system of claim 1, wherein: the track-engaging assembly comprises a frame supporting the idler wheels; the frame comprises a longitudinal base carrying the idler wheels; the longitudinal base of the frame of the track-engaging assembly comprises a void; and a given one of the idler wheels is disposed in the void.

25. The track system of claim 24, wherein: the void is a first void; the given one of the idler wheels is a first one of the idler wheels; the longitudinal base of the frame of the track-engaging assembly comprises a second void spaced from the first void in the longitudinal direction of the track system; and a second one of the idler wheels is disposed in the second void.

26. The track system of claim 25, wherein: the first void is located in a front region of the longitudinal base of the frame of the track-engaging assembly; the first one of the idler wheels is the leading one of the idler wheels; the second void is located in a rear region of the longitudinal base of the frame of the track-engaging assembly; and the second one of the idler wheels is the trailing one of the idler wheels.

27. The track system of claim 25, wherein: the longitudinal base of the frame of the track-engaging assembly comprises a third void between the first void and the second void in the longitudinal direction of the track system; and a third one of the idler wheels is disposed in the third void.

28. The track system of claim 27, wherein: the first void is located in a front region of the longitudinal base of the frame of the track-engaging assembly; the first one of the idler wheels is the leading one of the idler wheels; the second void is located in a rear region of the longitudinal base of the frame of the track-engaging assembly; the second one of the idler wheels is the trailing one of the idler wheels; the third void is located in an intermediate region of the longitudinal base of the frame of the track-engaging assembly; and the third one of the idler wheels is a roller wheel.

29. The track system of claim 28, wherein: the roller wheel is a first roller wheel; and a fourth one of the idler wheels is a second roller wheel and is disposed in the third void.

30. The track system of claim 29, wherein the first roller wheel and the second roller wheel are mounted together to pivot about a pivot axis between the first roller wheel and the second roller wheel in the longitudinal direction of the track system.

31. The track system of claim 1, wherein each of the idler wheels is aligned with the drive wheel in the widthwise direction of the track system.

32. The track system of claim 1, wherein each of the idler wheels is narrower than the drive wheel in the widthwise direction of the track system.

33. The track system of claim 1, wherein the track-engaging assembly is configured such that every part of the track-engaging assembly that contacts the bottom run of the track remains in contact with the bottom run of the track even if the track system is cambered.

34. The track system of claim 1, wherein the track-engaging assembly is configured such that every idler wheel remains in contact with the bottom run of the track even if the track system is cambered.

35. The track system of claim 1, wherein: the track comprises lateral portions extending from lateral extremities of the track-engaging assembly to lateral edges of the track; and the track-engaging assembly is configured to allow each of the lateral portions of the track to flex inwardly and absorb a shock when the track system encounters an obstacle on the ground.

36. The track system of claim 1, wherein: the cross-section of the track-engaging assembly is a first cross-section of the track-engaging assembly; and the area of contact between the track-engaging assembly and the bottom run of the track at a second cross-section of the track-engaging assembly where the track-engaging assembly contacts the bottom run of the track is wider in the widthwise direction of the track than the area of contact between the track-engaging assembly and the bottom run of the track at the first cross-section of the track-engaging assembly.

37. The track system of claim 36, wherein: a ratio of (1) a dimension of the area of contact between the track-engaging assembly and the bottom run of the track in the widthwise direction of the track system at the first cross-section of the track-engaging assembly over (2) the dimension of the area of contact between the track-engaging assembly and the bottom run of the track at the second cross-section of the track-engaging assembly is no more than 0.9.

38. The track system of claim 36, wherein: a ratio of (1) a dimension of the area of contact between the track-engaging assembly and the bottom run of the track in the widthwise direction of the track system at the first cross-section of the track-engaging assembly over (2) the dimension of the area of contact between the track-engaging assembly and the bottom run of the track at the second cross-section of the track-engaging assembly is no more than 0.7.

39. The track system of claim 1, wherein: the cross-section of the track-engaging assembly is a first cross-section of the track-engaging assembly; a first one of the idler wheels is located at the first cross-section of the track-engaging assembly; the area of contact between the track-engaging assembly and the bottom run of the track at a second cross-section of the track-engaging assembly where the track-engaging assembly contacts the bottom run of the track is wider in the widthwise direction of the track than the area of contact between the track-engaging assembly and the bottom run of the track at the first cross-section of the track-engaging assembly; and a second one of the idler wheels and a third one of the idler wheels are located at the second cross-section of the track-engaging assembly and spaced from one another in the widthwise direction of the track system.

40. The track system of claim 39, wherein: the track-engaging assembly comprises a frame supporting the idler wheels; the frame comprises a longitudinal base carrying the idler wheels; the first one of the idler wheels is contained within the longitudinal base of the frame of the track-engaging assembly in the widthwise direction of the track system; and the second one of the idler wheels and the third one of the idler wheels are respectively located outside of the longitudinal base of the frame of the track-engaging assembly and face outer lateral surfaces of the longitudinal base of the frame of the track-engaging assembly.

41. The track system of claim 1, wherein: the track-engaging assembly comprises a frame supporting the idler wheels; the frame comprises a longitudinal base carrying the idler wheels; the idler wheels include a plurality of roller wheels located between the leading one of the idler wheels and the trailing one of the idler wheels in the longitudinal direction of the track system; a given one of the leading one of the idler wheels and the trailing one of the idler wheels is contained within the longitudinal base of the frame of the track-engaging assembly in the widthwise direction of the track system; and a first one of the roller wheels and a second one of the roller wheels are respectively located outside of the longitudinal base of the frame of the track-engaging assembly and face outer lateral surfaces of the longitudinal base of the frame of the track-engaging assembly.

42. The track system of claim 1, wherein the wheel-contacting projections include drive projections for engaging the drive wheel to drive the track.

43. The track system of claim 1, wherein the track system is mountable to the vehicle such that the track system is steerable by a steering device of the vehicle to change an orientation of the track system relative to a frame of the vehicle in order to turn the vehicle.

44. The track system of claim 1, wherein the track system is mountable to the vehicle in place of a ground-engaging wheel comprising a tire.

45. The track system of claim 1, wherein: the idler wheels include a plurality of roller wheels located between the leading one of the idler wheels and the trailing one of the idler wheels in the longitudinal direction of the track system; and the bottom run of the track comprises a front segment under the leading idler wheel, a rear segment under the trailing idler wheel, and an intermediate segment under the roller wheels and extending lower than a given one of the front segment and the rear segment of the bottom run of the track.

46. The track system of claim 45, wherein the given one of the front segment and the rear segment of the bottom run of the track is the front segment of the bottom run of the track.

47. The track system of claim 46, wherein the intermediate segment of the bottom run of the track extends lower than the rear segment of the bottom run of the track.

48. The track system of claim 1, wherein: the idler wheels include a plurality of roller wheels located between the leading one of the idler wheels and the trailing one of the idler wheels in the longitudinal direction of the track system;

and a bottom of the leading idler wheel is higher than a bottom of a frontmost one of the roller wheels.

49. The track system of claim 48, wherein a bottom of the trailing idler wheel is higher than a bottom of a rearmost one of the roller wheels.

50. The track system of claim 1, wherein: the idler wheels include a plurality of roller wheels located between the leading one of the idler wheels and the trailing one of the idler wheels in the longitudinal direction of the track system; and a bottom of the leading idler wheel is higher than a bottom of the trailing idler wheel.

51. The track system of claim 1, wherein: the idler wheels include a plurality of roller wheels located between the leading one of the idler wheels and the trailing one of the idler wheels in the longitudinal direction of the track system; and a distance between the axis of rotation of the drive wheel and the axis of rotation of the leading one of the idler wheels in the longitudinal direction of the track system is different from a distance between the axis of rotation of the drive wheel and the axis of rotation of the trailing one of the idler wheels in the longitudinal direction of the track system.

52. The track system of claim 1, wherein the track-engaging assembly is pivotable relative to a frame of the vehicle about an axis of rotation parallel to the widthwise direction of the track system.

53. The track system of claim 1, wherein the vehicle is an all-terrain vehicle (ATV).

54. A track system for a vehicle, the track system comprising:
  a track comprising a ground-engaging outer surface for engaging the ground, an inner surface opposite to the ground-engaging outer surface, and a plurality of wheel-contacting projections projecting from the inner surface; and
  a track-engaging assembly configured to move the track around the track-engaging assembly;
  wherein: the track is elastomeric to flex around the track-engaging assembly; each wheel-contacting projection of the track comprises elastomeric material constituting at least most of the wheel-contacting projection; an area of contact between the track-engaging assembly and a bottom run of the track encompasses every part of the track-engaging assembly contacting the bottom run of the track; a span of the area of contact between the track-engaging assembly and the bottom run of the track is a distance from a rightmost point of the area of contact between the track-engaging assembly and the bottom run of the track to a leftmost point of the area of contact between the track-engaging assembly and the bottom run of the track and is less than half of a width of the track in a widthwise direction of the track system at every cross-section of the track-engaging assembly where the track-engaging assembly contacts the bottom run of the track; the track-engaging assembly comprises a drive wheel for driving the track and a plurality of idler wheels contacting the bottom run of the track; and an axis of rotation of the drive wheel is located between an axis of rotation of a leading one of the idler wheels and an axis of rotation of a trailing one of the idler wheels in a longitudinal direction of the track system.

55. The track system of claim 54, wherein the wheel-contacting projections include drive projections for engaging the drive wheel to drive the track.

56. A track system for a vehicle, the track system comprising:
  a track comprising a ground-engaging outer surface for engaging the ground, an inner surface opposite to the ground-engaging outer surface, and a plurality of wheel-contacting projections projecting from the inner surface; and
  a track-engaging assembly configured to move the track around the track-engaging assembly, the track-engaging assembly comprising a drive wheel for driving the track and a plurality of idler wheels contacting a bottom run of the track;
  wherein: the track is elastomeric to flex around the track-engaging assembly; each wheel-contacting projection of the track comprises elastomeric material constituting at least most of the wheel-contacting projection; an area of contact between the track-engaging assembly and a bottom run of the track encompasses every part of the track-engaging assembly contacting the bottom run of the track; a span of the area of contact between the track-engaging assembly and the bottom run of the track is a distance from a rightmost point of the area of contact between the track-engaging assembly and the bottom run of the track to a leftmost point of the area of contact between the track-engaging assembly and the bottom run of the track and is less than half of a width of the track in a widthwise direction of the track system at cross-sections of the track-engaging assembly where respective ones of the idler wheels contact the bottom run of the track; and an axis of rotation of the drive wheel is located between an axis of rotation of a leading one of the idler wheels and an axis of rotation of a trailing one of the idler wheels in a longitudinal direction of the track system.

57. The track system of claim 56, wherein the span of the area of contact between the track-engaging assembly and the bottom run of the track is less than half of the width of the track in the widthwise direction of the track system at every cross-section of the track-engaging assembly where an idler wheel contacts the bottom run of the track.

58. The track system of claim 56, wherein the wheel-contacting projections include drive projections for engaging the drive wheel to drive the track.

59. A track system for a vehicle, the track system comprising:
  a track comprising a ground-engaging outer surface for engaging the ground, an inner surface opposite to the ground-engaging outer surface, and a plurality of wheel-contacting projections projecting from the inner surface; and
  a track-engaging assembly configured to move the track around the track-engaging assembly, the track-engaging assembly comprising a drive wheel for driving the track, a plurality of idler wheels contacting a bottom run of the track, and a frame supporting the idler wheels, the frame comprising a longitudinal base carrying the idler wheels;
  wherein: the track is elastomeric to flex around the track-engaging assembly; each wheel-contacting projection of the track comprises elastomeric material constituting at least most of the wheel-contacting projection; every idler wheel is contained within the longitudinal base of the frame of the track-engaging assembly in a widthwise direction of the track system; and an axis of rotation of the drive wheel is located between an axis of rotation of a leading one of the idler wheels and an axis of rotation of a trailing one of the idler wheels in a longitudinal direction of the track system.

60. The track system of claim 59, wherein the wheel-contacting projections include drive projections for engaging the drive wheel to drive the track.

61. A track system for a vehicle, the track system comprising:
- a track comprising a ground-engaging outer surface for engaging the ground, an inner surface opposite to the ground-engaging outer surface, and a plurality of wheel-contacting projections projecting from the inner surface; and
- a track-engaging assembly configured to move the track around the track-engaging assembly, the track-engaging assembly comprising a drive wheel for driving the track and a plurality of idler wheels contacting a bottom run of the track, the idler wheels including a leading idler wheel and a trailing idler wheel spaced from one another in a longitudinal direction of the track system;
- wherein: the track is elastomeric to flex around the track-engaging assembly; each wheel-contacting projection of the track comprises elastomeric material constituting at least most of the wheel-contacting projection; the leading idler wheel and the trailing idler wheel are centrally disposed in a widthwise direction of the track system such that each of the leading idler wheel and the trailing idler wheel overlaps a centerline of the track that bisects the track in the widthwise direction of the track; and an axis of rotation of the drive wheel is located between an axis of rotation of the leading idler wheel and an axis of rotation of the trailing idler wheel in the longitudinal direction of the track system.

62. The track system of claim 61, wherein: the idler wheels include a plurality of roller wheels located between the leading idler wheel and the trailing idler wheel in the longitudinal direction of the track system; and the roller wheels are centrally disposed in the widthwise direction of the track system such that each of the roller wheels overlaps the centerline of the track.

63. The track system of claim 61, wherein the wheel-contacting projections include drive projections for engaging the drive wheel to drive the track.

64. A track system for a vehicle, the track system comprising:
- a track comprising a ground-engaging outer surface for engaging the ground, an inner surface opposite to the ground-engaging outer surface, and a plurality of wheel-contacting projections projecting from the inner surface; and
- a track-engaging assembly configured to move the track around the track-engaging assembly;
- wherein: the track is elastomeric to flex around the track-engaging assembly; each wheel-contacting projection of the track comprises elastomeric material constituting at least most of the wheel-contacting projection; an area of contact between the track-engaging assembly and a bottom run of the track is continuous in a widthwise direction of the track system and spans less than half of a width of the track in the widthwise direction of the track system at a cross-section of the track-engaging assembly where the track-engaging assembly contacts the bottom run of the track; the track-engaging assembly comprises a drive wheel for driving the track and a plurality of idler wheels contacting the bottom run of the track; and an axis of rotation of the drive wheel is located between an axis of rotation of a leading one of the idler wheels and an axis of rotation of a trailing one of the idler wheels in a longitudinal direction of the track system.

65. A track system for a vehicle, the track system comprising:
- a track comprising a ground-engaging outer surface for engaging the ground, an inner surface opposite to the ground-engaging outer surface, and a plurality of wheel-contacting projections projecting from the inner surface; and
- a track-engaging assembly configured to move the track around the track-engaging assembly;
- wherein: the track is elastomeric to flex around the track-engaging assembly; each wheel-contacting projection of the track comprises elastomeric material constituting at least most of the wheel-contacting projection; an area of contact between the track-engaging assembly and a bottom run of the track spans less than half of a width of the track in a widthwise direction of the track system at a cross-section of the track-engaging assembly where the track-engaging assembly contacts the bottom run of the track; the track-engaging assembly comprises a drive wheel for driving the track and a plurality of idler wheels contacting the bottom run of the track; an axis of rotation of the drive wheel is located between an axis of rotation of a leading one of the idler wheels and an axis of rotation of a trailing one of the idler wheels in a longitudinal direction of the track system; and the idler wheels are centrally disposed in the widthwise direction of the track system such that each of the idler wheels overlaps a centerline of the track that bisects the track in the widthwise direction.

66. A track system for a vehicle, the track system comprising:
- a track comprising a ground-engaging outer surface for engaging the ground, an inner surface opposite to the ground-engaging outer surface, and a plurality of wheel-contacting projections projecting from the inner surface; and
- a track-engaging assembly configured to move the track around the track-engaging assembly;
- wherein: the track is elastomeric to flex around the track-engaging assembly; each wheel-contacting projection of the track comprises elastomeric material constituting at least most of the wheel-contacting projection; an area of contact between the track-engaging assembly and a bottom run of the track spans less than half of a width of the track in a widthwise direction of the track system at a cross-section of the track-engaging assembly where the track-engaging assembly contacts the bottom run of the track; the track-engaging assembly comprises a drive wheel for driving the track and a plurality of idler wheels contacting the bottom run of the track; an axis of rotation of the drive wheel is located between an axis of rotation of a leading one of the idler wheels and an axis of rotation of a trailing one of the idler wheels in a longitudinal direction of the track system; the track-engaging assembly comprises a frame supporting the idler wheels; the frame comprises a longitudinal base carrying the idler wheels; the longitudinal base of the frame of the track-engaging assembly comprises a void; and a given one of the idler wheels is disposed in the void.

* * * * *